US010973208B2

(12) United States Patent
Collinson et al.

(10) Patent No.: US 10,973,208 B2
(45) Date of Patent: Apr. 13, 2021

(54) INOCULATION SYSTEMS FOR BEE HIVES AND RELATED METHODS

(71) Applicant: Bee Vectoring Technology Inc., Mississauga (CA)

(72) Inventors: Michael Collinson, Caledon (CA); Robert Moeller, Waterdown (CA); Peter Dicks, Mississauga (CA)

(73) Assignee: Bee Vectoring Technology Inc., Mississauga (CA)

( * ) Notice: Subject to any disclaimer, the term of this patent is extended or adjusted under 35 U.S.C. 154(b) by 0 days.

(21) Appl. No.: 16/427,729

(22) Filed: May 31, 2019

(65) Prior Publication Data

US 2019/0357502 A1 Nov. 28, 2019

Related U.S. Application Data

(63) Continuation of application No. PCT/CA2017/051450, filed on Dec. 1, 2017.

(60) Provisional application No. 62/429,357, filed on Dec. 2, 2016.

(51) Int. Cl.
*A01K 51/00* (2006.01)
*A01K 47/06* (2006.01)

(52) U.S. Cl.
CPC .............. *A01K 51/00* (2013.01); *A01K 47/06* (2013.01)

(58) Field of Classification Search
CPC ........ A01K 47/00; A01K 47/06; A01K 51/00; A01K 29/00; A01K 29/005
USPC .................................................. 449/1–3, 20
See application file for complete search history.

(56) References Cited

U.S. PATENT DOCUMENTS

| 2,485,879 | A | * | 10/1949 | Harwood | A01K 47/06 449/23 |
| 3,069,702 | A | * | 12/1962 | Reed | A01K 47/06 449/19 |
| 3,371,360 | A | * | 3/1968 | Antles | A01K 47/06 449/19 |
| 4,158,900 | A | | 6/1979 | Musgrove | |

(Continued)

FOREIGN PATENT DOCUMENTS

| GB | 1470385 A | 4/1977 |
| WO | 02094014 A1 | 11/2002 |

(Continued)

OTHER PUBLICATIONS

Written Opinion and International Search Report of corresponding International Application No. PCT/CA2017/051450 dated Mar. 13, 2018, 11 pages.

*Primary Examiner* — Lisa L Tsang
(74) *Attorney, Agent, or Firm* — Bereskin & Parr LLP/S.E.N.C.R.L, S.R.L.

(57) ABSTRACT

An inoculation system for a bee hive having a hive opening includes (a) a body mountable to the hive intermediate the hive opening and an outside environment external the hive, (b) a bee pathway in the body for providing passage between the hive opening and the outside environment when the body is mounted to the hive, (c) a removable cartridge installed in the body and having a cartridge chamber storing an inoculum, and (d) an automatic inoculum dispenser in the body. The dispenser is operable to controllably dispense the inoculum from the cartridge chamber into the bee pathway to dust bees passing through the bee pathway with the inoculum.

14 Claims, 16 Drawing Sheets

(56) References Cited

U.S. PATENT DOCUMENTS

Figure 1A:
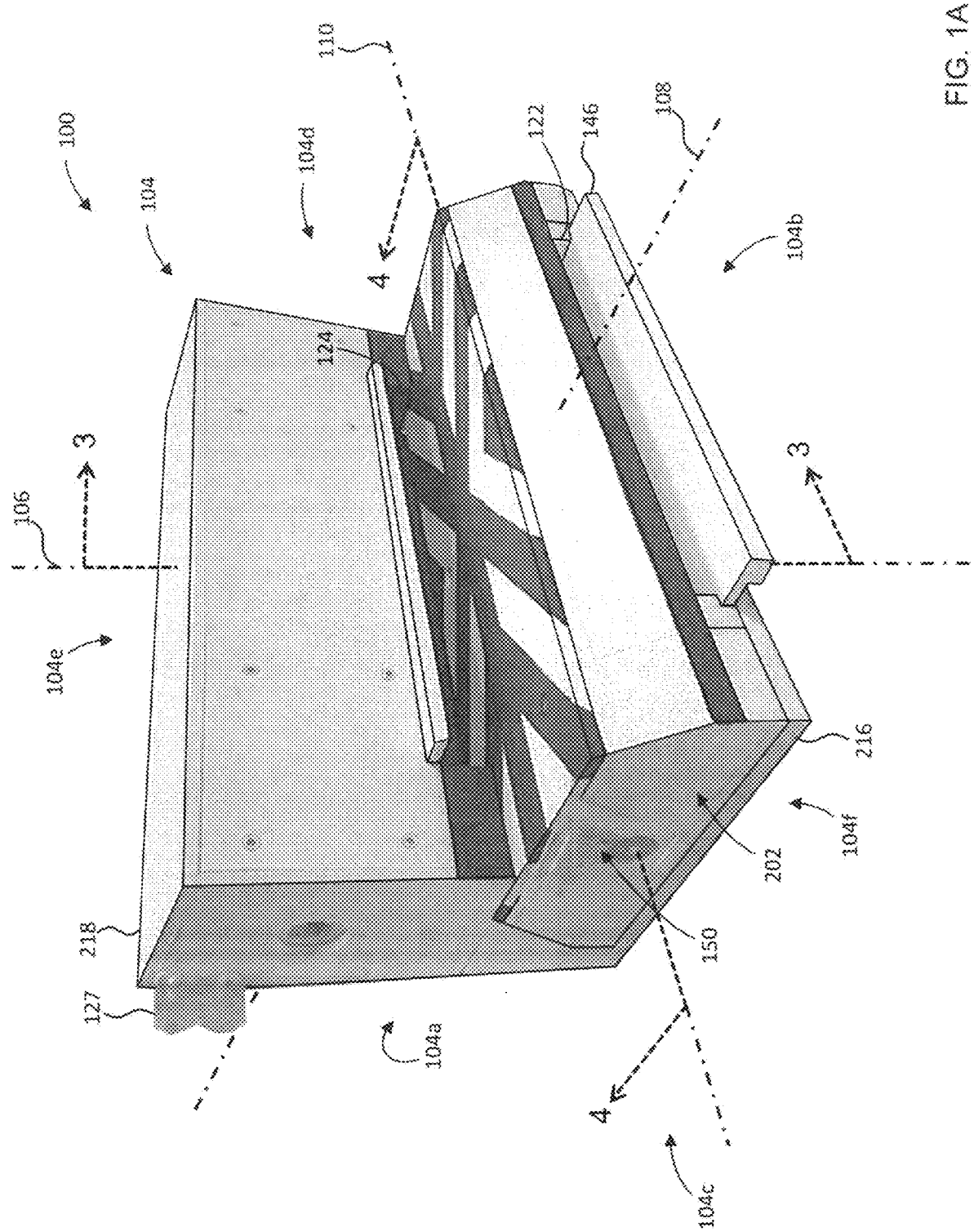

| | | | | |
|---|---|---|---|---|
| 5,348,511 | A * | 9/1994 | Gross | A01K 47/06 |
| | | | | 449/2 |
| 9,108,782 | B2 * | 8/2015 | Luc | A61L 9/12 |
| 9,357,752 | B2 | 6/2016 | Collinson et al. | |
| 10,278,370 | B2 * | 5/2019 | Put | A01K 51/00 |
| 2004/0219863 | A1 * | 11/2004 | Willacy | A01G 7/00 |
| | | | | 449/2 |
| 2010/0037512 | A1 * | 2/2010 | Durand | A01M 1/023 |
| | | | | 43/139 |
| 2015/0084784 | A1 * | 3/2015 | Suta | H04Q 9/02 |
| | | | | 340/870.01 |
| 2016/0353715 | A1 * | 12/2016 | Temby | A01K 47/06 |
| 2017/0000090 | A1 * | 1/2017 | Hall | A01K 29/005 |
| 2017/0095206 | A1 * | 4/2017 | Leib | G16H 40/63 |
| 2017/0208780 | A1 * | 7/2017 | Collins | A01K 53/00 |
| 2017/0223926 | A1 * | 8/2017 | Ausman | A01K 5/0283 |
| 2017/0360010 | A1 * | 12/2017 | Wilson-Rich | A01K 47/06 |

FOREIGN PATENT DOCUMENTS

| | | | | |
|---|---|---|---|---|
| WO | WO-2010033197 | A1 * | 3/2010 | A01K 5/0275 |
| WO | WO-2011097749 | A1 * | 8/2011 | A01K 47/06 |
| WO | WO-2016203463 | A1 * | 12/2016 | A01M 13/00 |

\* cited by examiner

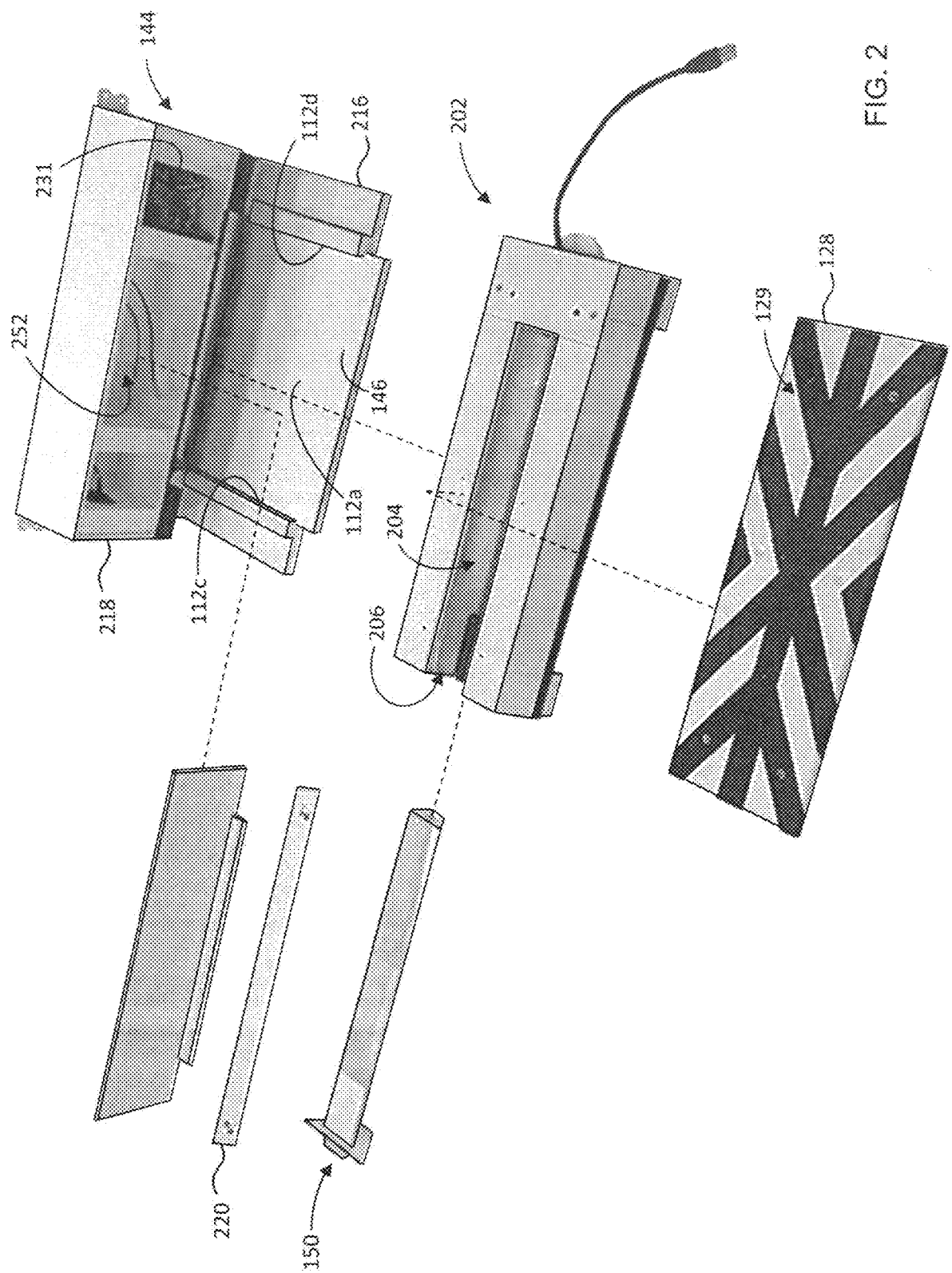

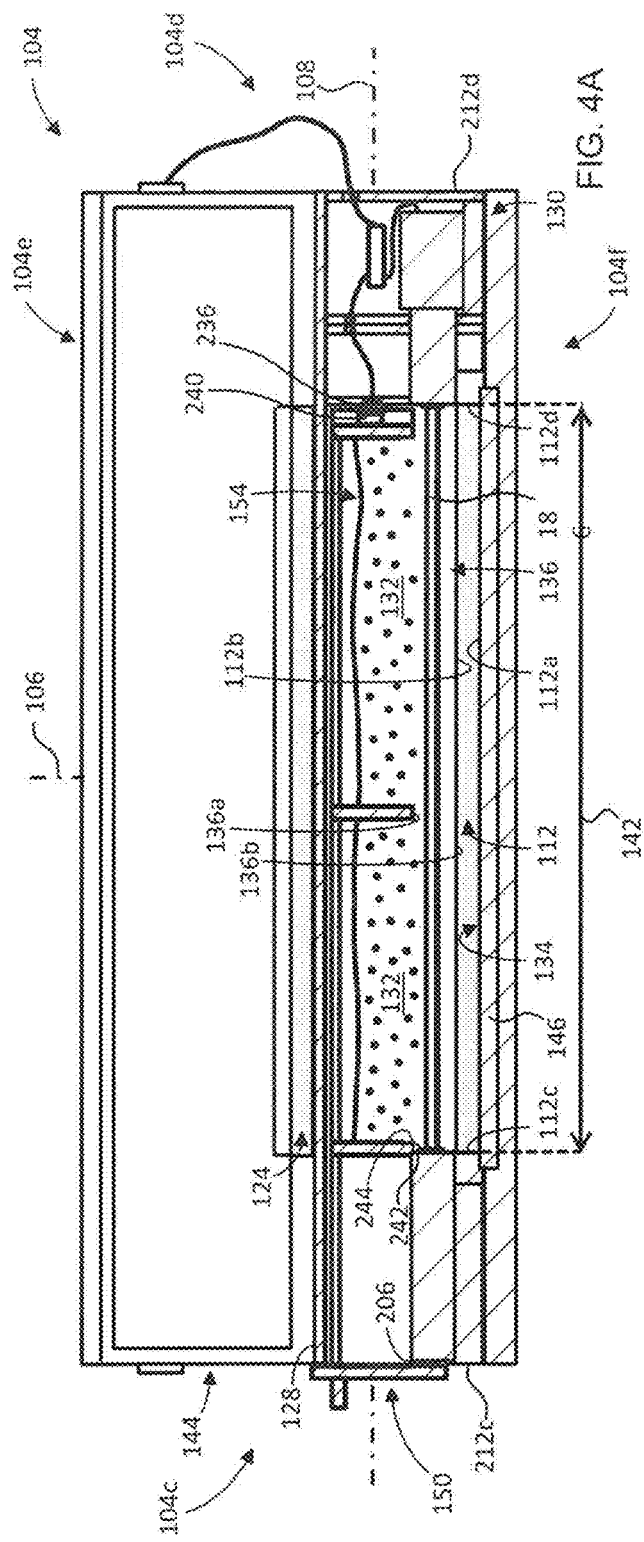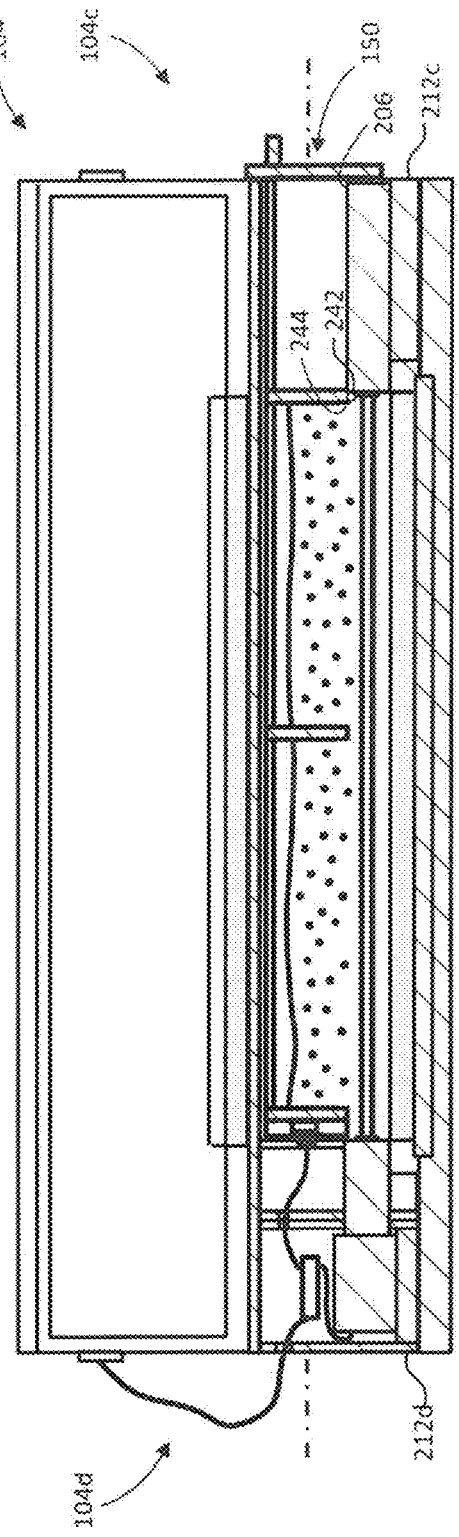

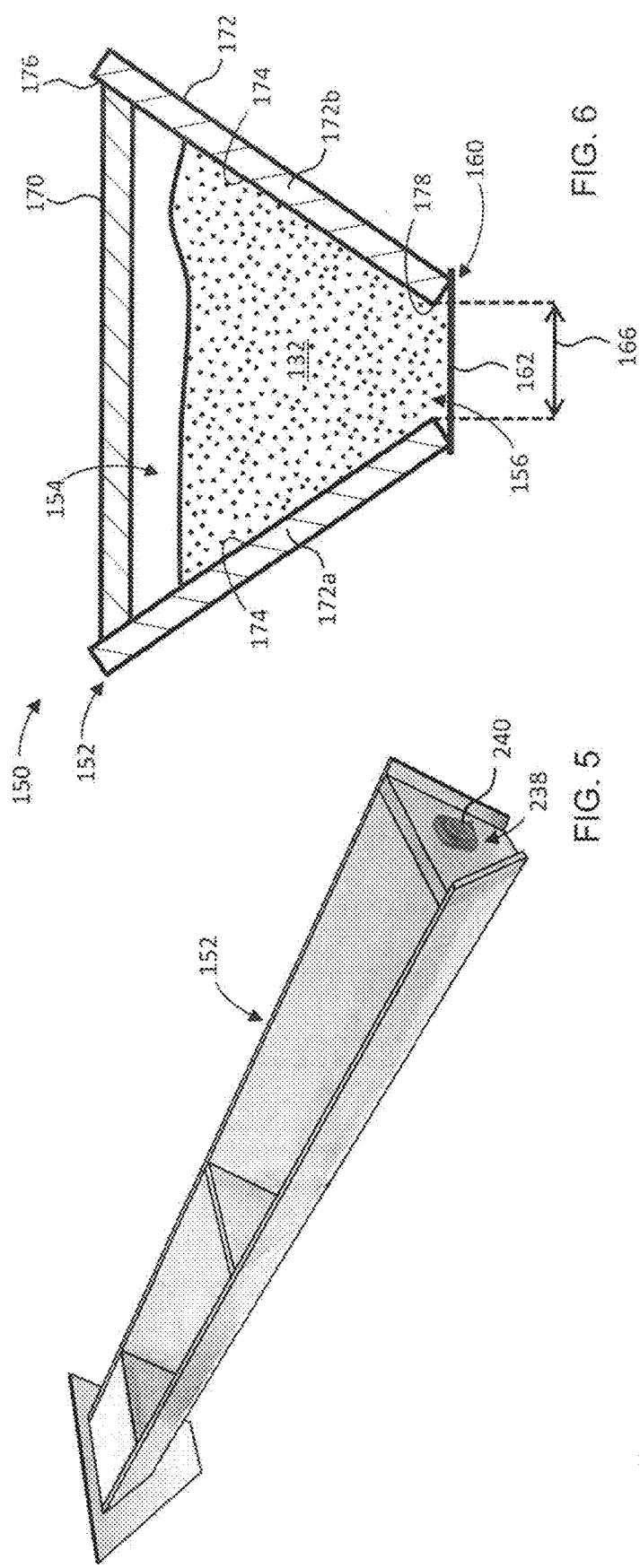
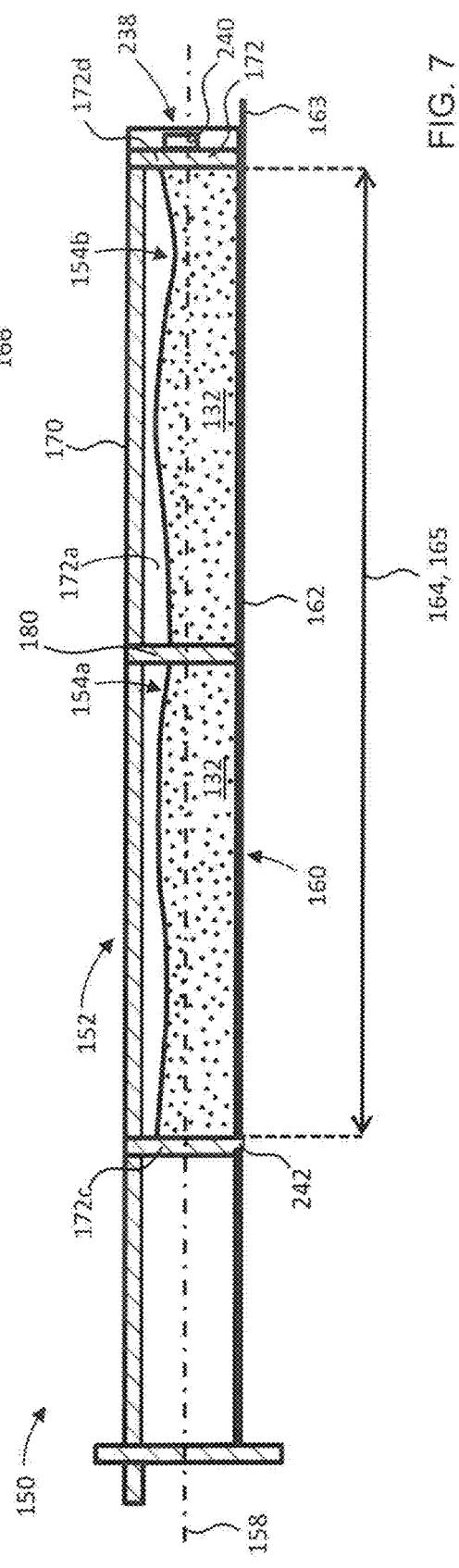

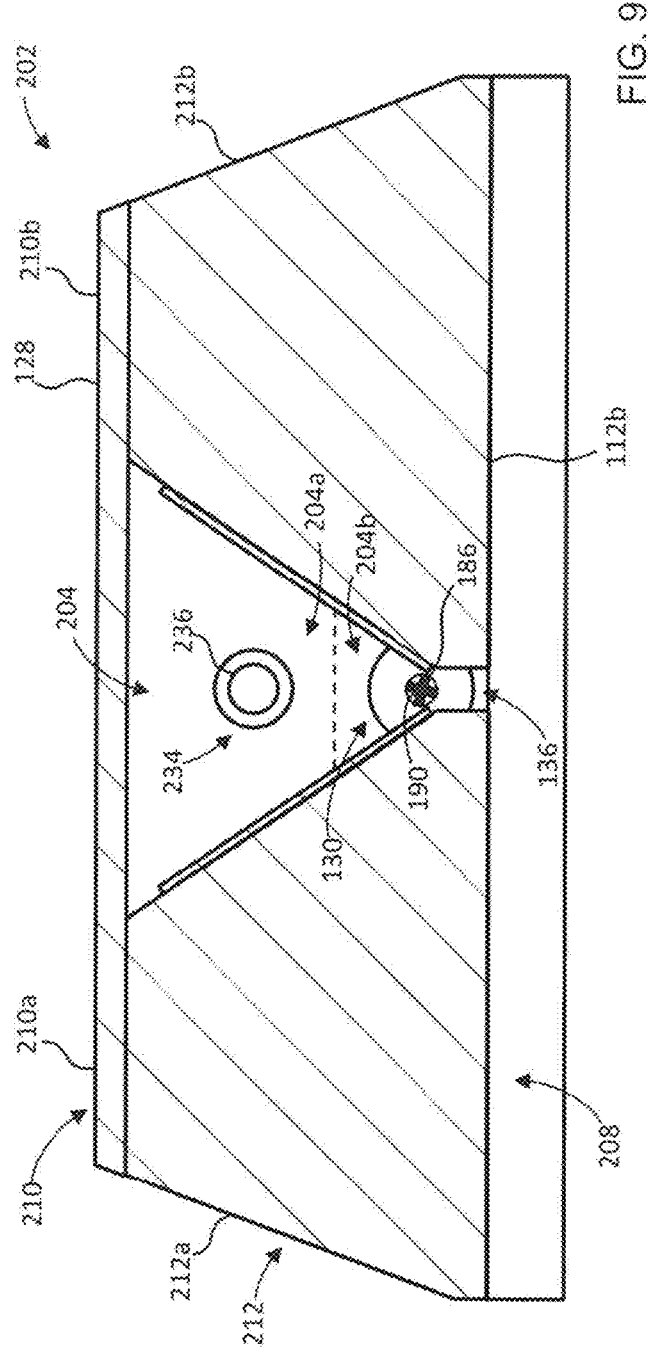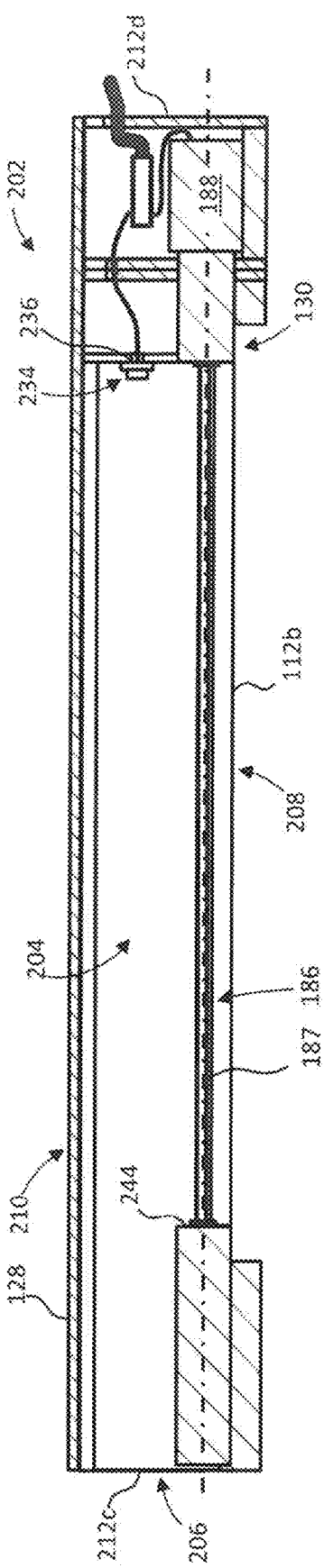

INOCULATION SYSTEMS FOR BEE HIVES AND RELATED METHODS

CROSS-REFERENCE TO RELATED APPLICATIONS

This application is a continuation of International Application No. PCT/CA2017/051450 filed Dec. 1, 2016, which claims the benefit of U.S. Provisional Application No. 62/429,357, filed on Dec. 2, 2016, the entirety of each of which is incorporated herein by reference.

FIELD

This disclosure relates to bee hives. Specifically, this disclosure relates to automated inoculation systems for bee hives, and methods of operating and controlling operation of such systems.

BACKGROUND

U.S. Pat. No. 3,069,702 (Reed) discloses an apparatus for coating honey bees with pollen for improving pollination of plant blossom by said honey bees. The apparatus includes an automatic feeder device which automatically deposits pollen at the required rate into a trough through which honey bees walk as they leave a beehive.

U.K. Pat. No. 1,470,385 (Legge) discloses a dispenser, suitable for applying a coating substance, e.g. pollen or antibiotic compound to bees emerging from a hive, comprising an inverted bottle, containing the coating substance and mounted above a channeled shoot in a hopper, at the base of which is a horizontal roller with a surface array of conical depressions. Removal of a seal by a manual slide results in the coating substance being released into the hopper and distributed in a fine curtain from the rotating roller.

U.S. Pat. No. 9,357,752 (Collinson et. al.) discloses a tray for positioning in an exit path of a bee hive including a base, a bee entrance end, and a bee exit end. Spaced apart side walls extend upwardly from the base. The sidewalls extend generally lengthwise between the bee entrance end and bee exit end. A plurality of posts extend upwardly from the base and are positioned between the bee entrance end and the bee exit end. The posts are generally circular in cross-section. The posts act as obstacles around which the bees must walk to reach the bee exit end from the bee entrance end.

SUMMARY

The following summary is intended to introduce the reader to various aspects of the applicant's teaching, but not to define or delimit any invention.

According to some aspects, an inoculation system for a bee hive having a hive opening includes (a) a body mountable to the hive intermediate the hive opening and an outside environment external the hive; (b) a first bee pathway in the body for providing passage for bees between the hive opening and the outside environment when the body is mounted to the hive; (c) a removable cartridge installed in the body and having a cartridge chamber storing an inoculum; and (d) an automatic inoculum dispenser in the body. The dispenser is operable to controllably dispense the inoculum from the cartridge chamber into the first bee pathway to dust bees passing through the first bee pathway with the inoculum.

In some examples, an inoculum passage extends between a passage first end open to the cartridge chamber and a passage second end open to the first bee pathway, and the dispenser is operable to control flow of the inoculum from the cartridge chamber and through the inoculum passage.

In some examples, the dispenser includes a movable dispensing element within the inoculum passage intermediate the passage first and second ends. The dispensing element blocks the inoculum passage and is movable between at least one first position for receiving inoculum from the cartridge chamber and at least one second position for depositing the received inoculum into the first bee pathway.

In some examples, the cartridge chamber is sized to store a chamber volume of the inoculum, and the inoculum passage comprises a reservoir volume intermediate the cartridge chamber and the dispensing element. The reservoir volume is less than the chamber volume.

In some examples, the body includes a receptacle in which the cartridge is received. The receptacle has a receptacle opening through which the cartridge is slidable horizontally into and out from the receptacle for installation and removal of the cartridge when the body is mounted to the hive.

In some examples, the body includes a frame mountable to the hive and an inoculum housing mountable to the frame. The inoculum housing includes the receptacle, and the inoculum housing is reconfigurably mountable to the frame in a left-side configuration, in which the receptacle opening is accessible from a left side of the body to permit installation and removal of the cartridge from the left side of the body when the body is mounted to the hive, and a right-side configuration, in which the receptacle opening is accessible from a right side of the body opposite the left side to permit installation and removal of the cartridge from the right side of the body when the body is mounted to the hive.

In some examples, the housing includes a receptacle in which the cartridge is received, and a lid movable between an open position for providing access to the receptacle to install and remove the cartridge, and a closed position for covering the receptacle and the cartridge.

In some examples, the first bee pathway is defined by a first pathway floor, a first pathway ceiling above the first pathway floor, and a pair of spaced apart first pathway sidewalls extending between the first pathway floor and ceiling, and wherein the dispenser is operable to dispense the inoculum onto a target area of the first pathway floor. The pathway sidewalls are spaced apart by a first pathway width at the target area. The cartridge extends over at least 75% of the pathway width.

In some examples, the system further includes a second bee pathway in the body for providing passage for bees between the outside environment and the hive opening. The second bee pathway is above and separate from the first bee pathway. When the body is mounted to the hive, the first bee pathway serves as a hive exit and the second bee pathway serves as a hive entrance. In some examples, the dispenser is vertically intermediate the first bee pathway and the second bee pathway.

According to some aspects, a kit for assembling an inoculation system for a bee hive having a hive opening includes: (a) a body mountable to the hive intermediate the hive opening and an outside environment external the hive; (b) a removable cartridge for installation in the body, the cartridge storing an inoculum; and (c) an automatic inoculum dispenser operable to controllably dispense the inoculum from the cartridge into a bee pathway in the body to dust bees passing through the bee pathway with the inoculum when the cartridge is installed in the body.

In some examples, the cartridge includes an internal cartridge chamber storing the inoculum, and a releasable seal layer sealing the cartridge chamber to prevent release of the inoculum prior to installation of the cartridge. In some examples, the housing includes a receptacle in communication with the dispenser for receiving the cartridge, and a seal release member in the body for engagement with the seal layer during insertion of the cartridge into the receptacle to release the seal layer for providing the inoculum from the cartridge chamber to the dispenser.

According to some aspects, an adjustable inoculation system is disclosed for installation in either one of a first bee hive having a first hive opening of a first opening width and a second bee hive having a second hive opening of a second opening width different from the first opening width. The system includes (a) a body including a frame and a pair of adjustable installation posts mounted to and protruding from a rear side of the frame. The posts are spaced laterally apart from one another by a lateral post spacing. The post spacing is adjustable for accommodating insertion of the installation posts into either one of the first hive opening and the second hive opening to mount the body to a respective one of the first bee hive and the second bee hive. The system further includes (b) a bee pathway in the body laterally intermediate the first and second installation posts for providing passage for bees between an outside environment and a respective one of the first hive opening and the second hive opening when the body is mounted to the one of the first bee hive and the second bee hive; and (c) an inoculum dispenser mounted in the body. The dispenser is operable to dispense an inoculum into the bee pathway to dust bees passing through the bee pathway with the inoculum.

In some examples, the frame includes a left-side frame portion supporting a left one of the installation posts and a right-side frame portion adjustably coupled to the left-side frame portion and supporting a right one of the installation posts. The left-side and right-side portions are laterally slidable relative to one another for adjusting the lateral post spacing.

In some examples, the system further includes a first mount attached to the rear side of the frame above the posts, and a second mount attachable to an exterior of either one of the first bee hive and the second bee hive. The second mount is engageable with the first mount when the second mount is attached, to removably mount the body to the one of the first bee hive and the second bee hive. In some examples, the first mount includes a hook and the second mount includes a catch for holding the hook when the catch is attached to the one of the first bee hive and the second bee hive.

According to some aspects, a reconfigurable inoculation system for a bee hive having a hive opening includes: (a) a body mountable to the hive intermediate the hive opening and an outside environment external the hive; (b) a first bee pathway in the body for providing passage for bees between the hive opening and the outside environment when the body is mounted to the hive; and (c) an automatic inoculum dispenser mounted in the body. The dispenser is operable to controllably dispense an inoculum into the first bee pathway to dust bees passing through the first bee pathway with the inoculum. The system further includes (d) a second bee pathway in the body and separate from the first bee pathway, the second bee pathway extending at least partially between the outside environment and the hive opening when the body is mounted to the hive; and (e) a blocking member movable between a blocked configuration in which the blocking member obstructs the second bee pathway for blocking passage of bees through the second bee pathway, and an unblocked configuration in which the blocking member is clear of the second bee pathway for permitting passage of bees through the second bee pathway. When the blocking member is in the unblocked configuration, the second bee pathway serves as a hive entrance for the hive and the first bee pathway serves as a hive exit for the hive to facilitate inoculation of bees exiting the hive. When the blocking member is in the blocked configuration, the first bee pathway serves as both the hive exit and the hive entrance for the hive to facilitate inoculation of bees entering the hive.

According to some aspects, a method of inoculating bees passing through an inoculation system mounted to a bee hive includes: (a) dispensing a first inoculum into a first bee pathway in the system to dust bees exiting the hive via the first bee pathway with the first inoculum. The system includes a second bee pathway separate from the first bee pathway. The second bee pathway serves as a hive entrance during step (a). The method further includes (b) blocking the second bee pathway to obstruct passage through the second bee pathway and compel bees to use the first bee pathway to enter the hive; and (c) when the second bee pathway is blocked, dispensing a second inoculum into the first bee pathway to inoculate bees entering the hive via the first bee pathway with the second inoculum. The second inoculum is different from the first inoculum. In some examples, the first inoculum includes a plant treatment agent, and the second inoculum includes a bee treatment agent.

According to some aspects, an inoculation system for a bee hive having a hive opening includes: (a) a body mountable to the hive intermediate the hive opening and an outside environment external the hive; (b) a bee pathway in the body for providing passage for bees between the hive opening and the outside environment when the body is mounted to the hive; (c) an inoculum dispenser operable to controllably dispense inoculum into the bee pathway to dust bees passing through the bee pathway with the inoculum; and (d) a removable cartridge for installation in the body. The cartridge includes an internal cartridge chamber storing inoculum for providing to the dispenser, and a releasable seal layer sealing the cartridge chamber to prevent release of the inoculum prior to installation of the cartridge. The system further includes (e) a receptacle in the body and in communication with the dispenser for receiving the cartridge; and (f) a seal release member in the body for engagement with the seal layer during insertion of the cartridge into the receptacle to release the seal layer for providing the inoculum from the cartridge chamber to the dispenser.

According to some aspects, an inoculation system for a bee hive having a hive opening includes: (a) a body mountable to the bee hive intermediate the hive opening and an outside environment external the hive; (b) a bee pathway in the body for providing passage for bees between the hive opening and an outside environment when the body is mounted to the hive; and (c) an inoculum dispenser mounted in the body. The dispenser is operable to controllably dispense inoculum into the bee pathway to dust bees passing through the bee pathway with the inoculum. The system further includes (d) a controller for controlling operation of the dispenser according to one or more operating parameters. The controller is operable to detect a modification event and to modify the one or more operating parameters in response to detecting the modification event.

In some examples, the controller is operable to detect the modification event by: receiving at least one environment signal representative of one or more environmental states, and determining that a modification condition is satisfied based on the one or more environmental states. In some examples, the controller is operable to, in response to determining that the modification condition is satisfied, modify the one or more operating parameters to correspond to target parameters associated with the environmental states.

In some examples, the operating parameters include one of an on state of the dispenser and an off state of the dispenser, and the target parameters include the other one of the on state and the off state.

In some examples, the operating parameters include a first rate at which to operate the dispenser, and the target parameters include a second rate at which to operate the dispenser. The second rate is different from the first rate.

In some examples, the operating parameters include a first time interval for operating the dispenser to periodically dispense the inoculum into the bee pathway, and the target parameters include a second time interval for operating the dispenser. The second time interval is different from the first time interval.

In some examples, the operating parameters include a first amount of inoculum for the dispenser to dispense, and the target parameters include a second amount of inoculum for the dispenser to dispense. The second amount is different from the first amount.

In some examples, the system includes at least one environment sensor for sensing the environmental states and generating the at least one environment signal.

In some examples, the at least one environment signal includes a time-of-day signal representative of a time of day, and the controller is operable to determine whether the modification condition is satisfied based on the time of day. In some examples, the system includes a clock for monitoring the time of day and generating the time-of-day signal.

In some examples, the at least one environment signal includes at least one daylight intensity signal representative of an intensity of daylight of the outside environment, and the controller is operable to determine whether the modification condition is satisfied based on the intensity of daylight. In some examples, the system further includes at least one daylight sensor for measuring the intensity of daylight and generating the daylight intensity signal.

In some examples, the at least one environment signal includes at least one temperature signal representative of a temperature of at least one of the outside environment, the bee pathway, and an interior of the bee hive, and the controller is operable to determine whether the modification condition is satisfied based on the temperature. In some examples, the system includes at least one temperature sensor for measuring the temperature and generating the temperature signal.

In some examples, the at least one environment signal includes at least one humidity signal representative of a humidity of the outside environment, and the controller is operable to determine whether the modification condition is satisfied based on the humidity. In some examples, the system further includes at least one humidity sensor for measuring the humidity and generating the humidity signal.

In some examples, the at least one environment signal includes at least one precipitation signal representative of a precipitation characteristic in the outside environment, and the controller is operable to determine whether the modification condition is satisfied based on the precipitation characteristic. In some examples, the system includes a precipitation sensor for measuring the precipitation characteristic and generating the precipitation signal.

In some examples, the at least one environment signal includes at least one remaining inoculum signal representative of a remaining amount of inoculum in the bee pathway, and the controller is operable to determine whether the modification condition is satisfied based on the remaining amount of inoculum. In some examples, the system further includes a remaining inoculum sensor for measuring the remaining inoculum in the bee pathway and generating the remaining inoculum signal.

In some examples, the at least one environment signal includes at least one motion signal representative of a motion of bees in the bee pathway, and the controller is operable to determine whether the modification condition is satisfied based on the motion of bees. In some examples, the system includes a motion sensor for detecting the motion of bees in the bee pathway and generating the motion signal.

In some examples, the at least one environment signal includes at least one bee rate signal representative of a rate of bees passing through the bee pathway, and the controller is operable to determine whether the modification condition is satisfied based on the rate of bees. In some examples, the system includes a bee rate sensor for measuring the rate of bees passing through the bee pathway and generating the bee rate signal.

In some examples, the at least one environment signal includes at least one cartridge installation signal representative of installation of an inoculum cartridge in the body for providing the inoculum to the dispenser, and the controller is operable to determine whether the modification condition is satisfied based on whether the cartridge is installed. In some examples, the system includes a cartridge installation sensor for detecting installation of the cartridge and generating the cartridge installation signal.

In some examples, the at least one environment signal includes at least one cartridge characteristic signal representative of a cartridge characteristic of a cartridge installed in the body for providing the inoculum to the dispenser, and the controller is operable to determine whether the modification condition is satisfied based on the cartridge characteristic. In some examples, the system further includes a cartridge characteristic sensor for sensing the cartridge characteristic and generating the cartridge characteristic signal.

In some examples, the at least one environment signal includes a hive size signal representative of a size of the bee hive, and the controller is operable to determine whether the modification condition is satisfied based on the hive size.

In some examples, the at least one environment signal includes a bee quantity signal representative of a quantity of bees expected to inhabit the hive, and the controller is operable to determine whether the modification condition is satisfied based on the quantity of bees.

In some examples, the at least one environment signal includes a bee type signal representative of a type of bee expected to inhabit the bee hive, and the controller is operable to determine whether the modification condition is satisfied based on the bee type.

In some examples, the system includes a communication unit operable to communicate with the controller, and the modification event includes receipt by the controller of a modification command from the communication unit. The modification command includes a modification to the operating parameters. In some examples, the communication unit includes a wireless communication unit.

In some examples, the system includes a positioning unit operable to determine a location of the bee hive.

In some examples, the system includes a power supply unit for supplying power to the system. The power supply unit includes a power storage unit and a solar power generator for charging the power storage unit.

According to some aspects, a method of controlling operation of an inoculation system for a bee hive includes (a) providing an inoculum to an automatic inoculum dispenser in a body of the system. The body is mounted to the hive and includes a bee pathway providing passage for bees between a hive opening of the hive and an outside environment external the hive. The method further includes (b) controlling operation of the dispenser according to one or more operating parameters to dispense the inoculum into the bee pathway for dusting bees passing through the bee pathway with the inoculum; (c) modifying the one or more operating parameters in response to detecting a modification event; and (d) controlling the operation of the dispenser according to one or more modified operating parameters.

In some examples, detecting the modification event includes: receiving at least one environment signal representative of one or more environmental states, and determining that a modification condition is satisfied based on the one or more environmental states. In some examples, step (c) includes modifying the operating parameters to correspond to target parameters associated with the environmental states.

In some examples, the modification event includes receiving a modification command from a communication unit. The modification command includes a modification to the operating parameters.

According to some aspects, an inoculation system for a bee yard including a first hive having a first hive opening and a second hive having a second hive opening includes: (a) a first body mountable to the first hive intermediate the first hive opening and an outside environment external the first and second hives; (b) a first hive bee pathway in the first body for providing passage for bees between the first hive opening of the first hive and the outside environment when the first body is mounted to the first hive; and (c) a first inoculum dispenser mounted in the first body. The first inoculum dispenser is operable to controllably dispense a first inoculum into the first hive bee pathway to dust bees passing through the first hive bee pathway with the first inoculum. The system further includes (d) a second body mountable to the second hive intermediate the second hive opening and the outside environment; (e) a second hive bee pathway in the second body for providing passage for bees between the second hive opening and the outside environment when the second body is mounted to the second hive; and (f) a second inoculum dispenser mounted in the second body. The second inoculum dispenser is operable to controllably dispense a second inoculum into the second hive bee pathway to dust bees passing through the second hive bee pathway with the second inoculum. The system further includes (g) a central controller for controlling operation of the first inoculum dispenser according to a first set of operating parameters and the second inoculum dispenser according to a second set of operating parameters.

In some examples, the controller is operable to detect a first modification event and to modify the first set of operating parameters in response to detecting the first modification event. In some examples, the controller is operable to detect a second modification event and to modify the second set of operating parameters in response to detecting the second modification event.

BRIEF DESCRIPTION OF THE DRAWINGS

The drawings included herewith are for illustrating various examples of systems, apparatuses, and method of the present specification and are not intended to limit the scope of what is taught in any way. In the drawings:

FIG. 1A is a perspective view of an example inoculation system for a bee hive, showing the system with an installed inoculum cartridge and in an unblocked configuration;

FIG. 1B is a perspective view like that of FIG. 1A, but showing the system in a blocked configuration;

FIG. 2 is an exploded perspective view of portions of the system of FIG. 1A;

FIG. 3 is a cross-sectional schematic of the system of FIG. 1A taken along line 3-3 of FIG. 1A;

FIG. 4A is a cross-sectional schematic of the system of FIG. 1A taken along line 4-4 of FIG. 1A, showing an inoculum housing of the system in a left-side configuration;

FIG. 4B is a cross-sectional schematic like that of FIG. 4A, but showing the inoculum housing in a right-side configuration;

FIG. 5 is a perspective view of portions of the inoculum cartridge of FIG. 1A, with portions of a top wall of the cartridge removed;

FIG. 6 is a cross-sectional schematic of the cartridge of FIG. 1A prior to installation, taken along line 3-3 of FIG. 1A;

FIG. 7 is a cross-sectional schematic of the cartridge of FIG. 1A prior to installation, taken along line 4-4 of FIG. 1A;

FIG. 8 is a top view of portions of the inoculum housing of the system of FIG. 1A, with a top wall of the inoculum housing removed;

FIG. 9 is a cross-sectional schematic of the inoculum housing of FIG. 1A, taken along line 3-3 of FIG. 1A;

FIG. 10 is a cross-sectional schematic of the inoculum housing of FIG. 1A, taken along line 4-4 of FIG. 1A;

FIG. 11 is a simplified schematic diagram of control components of the system of FIG. 1A;

FIG. 12 is a flow chart illustrating an example method of operating the system of FIG. 1A;

FIG. 13 is a flow chart illustrating an example method of inoculating bees using the system of FIG. 1A;

FIG. 14 is a cross-sectional schematic of another example inoculation system;

FIG. 15 is a schematic front perspective view of a frame portion of the system of FIG. 14;

FIG. 16 is a schematic rear perspective view of the frame portion of FIG. 15;

FIG. 17A is a schematic front view of portions of a first bee hive;

FIG. 17B is a schematic front view of portions of a second bee hive;

FIG. 18 is a schematic front perspective view of a housing portion for an inoculation system like that of FIG. 1;

FIG. 19 is a cross-sectional schematic of another example inoculation system, showing a cartridge of the system prior to insertion into a loader of the system;

FIG. 19A is a cross-sectional schematic like that of FIG. 19, but with the cartridge positioned in the loader, and with the loader shown in a loading position;

FIG. 19B is a cross-sectional schematic like that of FIG. 19, but with the cartridge positioned in the loader, and with the loader shown in a dispensing position;

FIG. 20 is a simplified schematic diagram of another example inoculation system;

FIG. 21 is a flow chart illustrated an example method of controlling operation of the system of FIG. 20; and FIG. 22 is an example inoculation system for a bee yard.

DETAILED DESCRIPTION

Various apparatuses, systems, or methods will be described below to provide an example of an embodiment of the claimed subject matter. No embodiment described below limits any claim and any claim may cover apparatuses, systems, or methods that differ from those described below. The claims are not limited to apparatuses, systems, or methods having all of the features of any one apparatus, system, or method described below or to features common to multiple or all of the apparatuses, systems, and methods described below. It is possible that an apparatus, system, or method described below is not an embodiment of any claim. Any subject matter disclosed in an apparatus, system, or method described below that is not claimed in this document may be the subject matter of another protective instrument, for example, a continuing patent application, and the applicants, inventors or owners do not intend to abandon, disclaim or dedicate to the public any subject matter by its disclosure in this document.

Disclosed herein are examples of an inoculation system for a bee hive. The bee hive can include, for example, a honey bee hive. The system can be mounted to a bee hive, so that bees (e.g. honey bees) entering and/or exiting the hive pass through the system. As the bees pass through the system, they are dusted with an inoculum. The inoculum can be in the form of a powder, and can include any substance for depositing onto a bee, for example for the benefit of the bee, the hive, or plants visited by the bee (i.e. the inoculum can be delivered to plants by the bees, in a process known as bee vectoring). For example, the inoculum can include a plant treatment agent (e.g. a fungus that is beneficial to plants, a pollen, or a fertilizer), a bee treatment agent, and/or a hive treatment agent (e.g. a miticide). The inoculum can be contained in a cartridge, and the system can automatically dispense the inoculum from the cartridge into a bee pathway of the system, so that bees entering and/or exiting the hive via the pathway are dusted with inoculum (either by walking through inoculum in the pathway, or by the inoculum being deposited directly on the bees). The inoculum can then be delivered to plants by the bees, delivered into the hive by the bees, and/or treat bees dusted with the inoculum. The cartridge can optionally be disposed of and replaced with a fresh cartridge as the inoculum is depleted from the cartridge. The system can be tuned so that the inoculum is deposited into the pathway slowly over time, for example at preset time intervals (e.g. of around 90 seconds), so that the bees are dusted with an effective amount of inoculum, but so that wastage of the inoculum is minimized, and so that the cartridge can be replaced relatively infrequently (e.g. after 2 weeks).

Referring to FIGS. 1A and 3, in the example illustrated, an inoculation system 100 for a bee hive 102 (FIG. 3) having a hive opening 102*a* (FIG. 3) is illustrated. The bee hive 102 can include, for example, a honey bee hive. The system 100 includes a body 104 mountable to the hive 102 intermediate the hive opening 102*a* and an outside environment 114 (FIG. 3) external the hive 102.

Referring to FIGS. 3 and 4A in the example illustrated, when the body 104 is mounted to the hive 102, the body 104 has a rear side 104*a* directed toward the hive 102, a front side 104*b* opposite the rear side 104*a* and directed away from the hive 102, spaced apart left and right sides 104*c*, 104*d* extending between the front and rear sides 104*a*, 104*b*, and spaced apart top and bottom ends 104*e*, 104*f* above and below, respectively, the front, rear, left, and right sides 104*a-d*. In the example illustrated, the body 104 has a vertical axis 106 extending between the top and bottom sides 104*e*, 104*f* of the body 104, a horizontal first axis 108 perpendicular to the vertical axis 106 and extending between the rear and front sides 104*a*, 104*b* of the body 104, and a horizontal second axis 110 perpendicular to the vertical and first axes 106, 108 and extending between the left and right sides 104*c*, 104*d* of the body 104.

Referring to FIG. 3, in the example illustrated, a first bee pathway 112 is provided in the body 104. In the example illustrated, the first bee pathway 112 extends at least partially between the hive opening 102*a* and the outside environment. The first bee pathway 112 provides passage for bees between the hive opening 102*a* and the outside environment 114 when the body 104 is mounted to the hive 102. In the example illustrated, the first bee pathway 112 permits passage of bees through the body 104 in at least a first pathway direction 116 generally toward the front side 104*b* of the body 104. The first pathway direction 116 is generally parallel to the horizontal first axis 108 of the body 104 in the example illustrated. In the example illustrated and in the configuration of FIGS. 1A and 3, the first bee pathway 112 serves as a hive exit.

In the example illustrated, the body 104 further includes a second bee pathway 118. The second bee pathway 118 extends at least partially between the hive opening 102*a* and the outside environment 114. In the example illustrated, the second bee pathway 118 is configurable to provide passage for bees between the outside environment 114 and the hive opening 102*a*. In the example illustrated and in the configuration of FIGS. 1A and 3, the second bee pathway 118 permits passage of bees through the body 104 in a second pathway direction 120 generally toward the rear side 104*a* of the body 104. In the example illustrated and in the configuration of FIGS. 1A and 3, the second bee pathway 118 serves as a hive entrance.

In the example illustrated, the body 104 includes a pathway header 123 providing communication between the first bee pathway 112 and the hive opening 102*a* and between the second bee pathway 118 and the hive opening 102*a*, when the body is mounted to the hive 102. In the example illustrated, the second bee pathway 118 is separate from the first bee pathway 112. In the example illustrated, the second bee pathway 118 is spaced vertically apart from the first bee pathway 112. In the example illustrated, the second bee pathway 118 is above the first bee pathway 112.

In the example illustrated, the body 104 includes first and second openings 122, 124. The first opening 122 is open to the outside environment 114 when the body 104 is mounted to the hive 102. The second opening 124 is open to the outside environment when the body 104 is mounted to the hive 102 and when the system 100 is in the configuration of FIGS. 1A and 3. The body 104 further includes a third opening 126 open to the hive opening 102*a* when the body 104 is mounted to the hive 102. In the example illustrated, the first and second openings 122, 124 are provided on the front side 104*b* of the body 104, and the third opening 126 is provided on the rear side 104*a* of the body 104. The first bee pathway 112 extends into the body 104 from the first opening 122 and is in communication with the third opening 126. The second bee pathway 118 extends into the body 104 from the second opening 124 and is in communication with the third opening 126. The second opening 124 is separate from the first opening 122. In the example illustrated, the second opening 124 is above the first opening 122. In the example illustrated, the pathway header 123 provides communication between the first bee pathway 112 and the third opening 126, and between the second bee pathway 118 and the third opening 126.

Referring to FIG. 1A and FIG. 3, in the example illustrated, the body 104 includes a set of installation posts 125 (FIG. 3) insertable into the hive opening 102*a* for positioning the third opening 126 of the body 104 over the hive opening 102*a* during installation, and a set of mounting brackets 127 (FIG. 1A) for mounting the body 104 to the hive 102.

Figure 3:
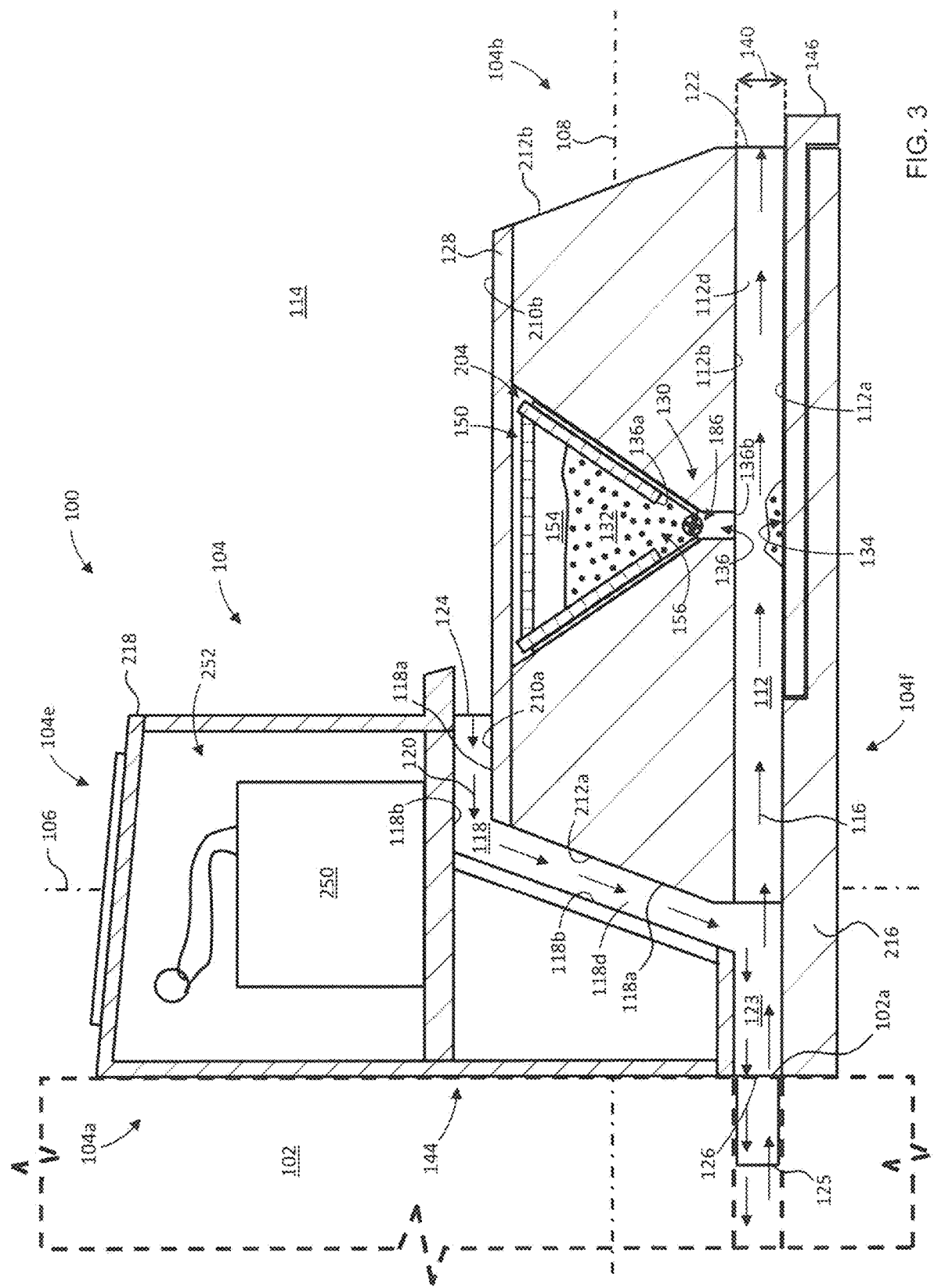

In the example illustrated, the body 104 includes an external landing board 128 in communication with the second bee pathway 118 for attracting bees to enter the hive 102 via the second bee pathway 118, when the system 100 is in the configuration of FIGS. 1A and 3. In the example illustrated and in the configuration of FIGS. 1A and 3, the second opening 124 is open to the landing board 128. The landing board 128 can include distinct visual markings 129 (FIGS. 1A to 2) to guide bees toward the second opening 124 for entering the hive 102 via the second bee pathway 118, when the system 100 is in the configuration of FIGS. 1A and 3.

Referring to FIGS. 3 and 4A, the system 100 includes an automatic inoculum dispenser 130 mounted in the body 104 for controllably dispensing an inoculum 132 into the first bee pathway 112, to dust bees passing through the first bee pathway 112 with the inoculum. The bees can be dusted in the first bee pathway 112 by moving through inoculum previously dispensed into the first pathway 112 (e.g., walking through inoculum resting on a floor of the first pathway 112). Alternatively or in addition, the bees can be dusted in the first bee pathway 112 through inoculum falling onto bees moving through the pathway 112 under the dispenser 130. In some examples, the inoculum can include a powdered plant treatment agent, for delivery to a target plant by the bees as they forage. In some examples, the inoculum can include a powdered bee or hive treatment agent, for delivery into the hive.

In the example illustrated, the first pathway 112 is defined by a first pathway floor 112*a*, a first pathway ceiling 112*b* above the first pathway floor 112*a*, and a pair of spaced apart first pathway sidewalls 112*c*, 112*d* extending between the first pathway floor and ceiling 112*a*, 112*b*. In the example illustrated, the dispenser 130 is operable to dispense the inoculum onto a target area 134 of the first pathway floor 112*a*. In the example illustrated, the dispenser 130 is operable to drop the inoculum onto the target area 134. In the example illustrated, bees moving along the first pathway floor 112*a*, for example, as the bees are exiting the hive to go foraging, walk through the target area 134, so that inoculum dispensed into the target area 134 may be picked up by and cling to the bees, for delivery to, for example, a target plant when the bees pollinate the target plant.

In the example illustrated, the first pathway ceiling 112*b* is spaced vertically apart (along the vertical axis 106, in the example illustrated) from the first pathway floor 112*a* by a ceiling height 140 (FIG. 3). The ceiling height 140 is selected to encourage bees to walk along the first pathway 112 through the target area 134 to facilitate inoculation of the bees with the inoculum. For example, the ceiling height 140 can be selected to discourage bees from flying through the first bee pathway 112.

In the example illustrated, the first pathway sidewalls 112*c*, 112*d* are spaced apart by a pathway width 142 (FIG. 4A) at the target area 134. In the example illustrated, the pathway width 142 is generally parallel to the horizontal second axis 110. The target area 134 can extend over at least 75% of the first pathway width 142 to facilitate inoculation of bees moving through the first bee pathway 112. In the example illustrated, the target area 134 extends over generally an entirety of the first pathway width 142.

In the example illustrated, the body 104 includes a frame 144 and a slidably removable tray 146 mounted to the frame 144 below the dispenser 130 (see also FIG. 2). In the example illustrated, the target area 134 of the first pathway floor 112*a* is provided on an upper surface of the tray 146. This can facilitate, for example, removal, cleaning, and/or inspection of portions of the first pathway floor 112*a*. In the example illustrated, the tray 146 is slidable along the horizontal first axis 108, and is removable from and reinsertable into the frame 144 from the front side 104*b* of the body 104.

In the example illustrated, the system 100 includes a removable inoculum cartridge 150 for installation in the body 104 to provide the inoculum to the dispenser 130. The cartridge includes a cartridge chamber 154 for storing the inoculum. In the example illustrated, the dispenser 130 is in communication with the cartridge chamber 154 when the cartridge 150 is installed. The dispenser 130 is operable to controllably dispense the inoculum from the cartridge chamber 154 into the first bee pathway 112 when the cartridge 150 is installed, to dust bees in the first bee pathway 112 with the inoculum.

In the example illustrated, the inoculum passes through an inoculum passage 136 between the cartridge chamber 154 and the first bee pathway 112. In the example illustrated, the dispenser 130 controls flow of the inoculum through the inoculum passage 136. The inoculum passage 136 has a passage first end 136*a* open to the cartridge chamber 154 and a passage second end 136*b* open to the first bee pathway 112. In the example illustrated, the passage second end 136*b* is open to the first pathway ceiling 112*b*. The inoculum passage 136 can extend over at least 75% of the pathway width 142. In the example illustrated the inoculum passage 136 extends over an entirety of the pathway width 142.

In the example illustrated, the dispenser 130 includes a dispensing element 186. The dispensing element 186 blocks the inoculum passage 136 for controlling flow of the inoculum through the inoculum passage 136. In the example illustrated, the dispensing element 186 is within the inoculum passage 136 intermediate the passage first and second ends 136*a*, 136*b*.

Figure 8:
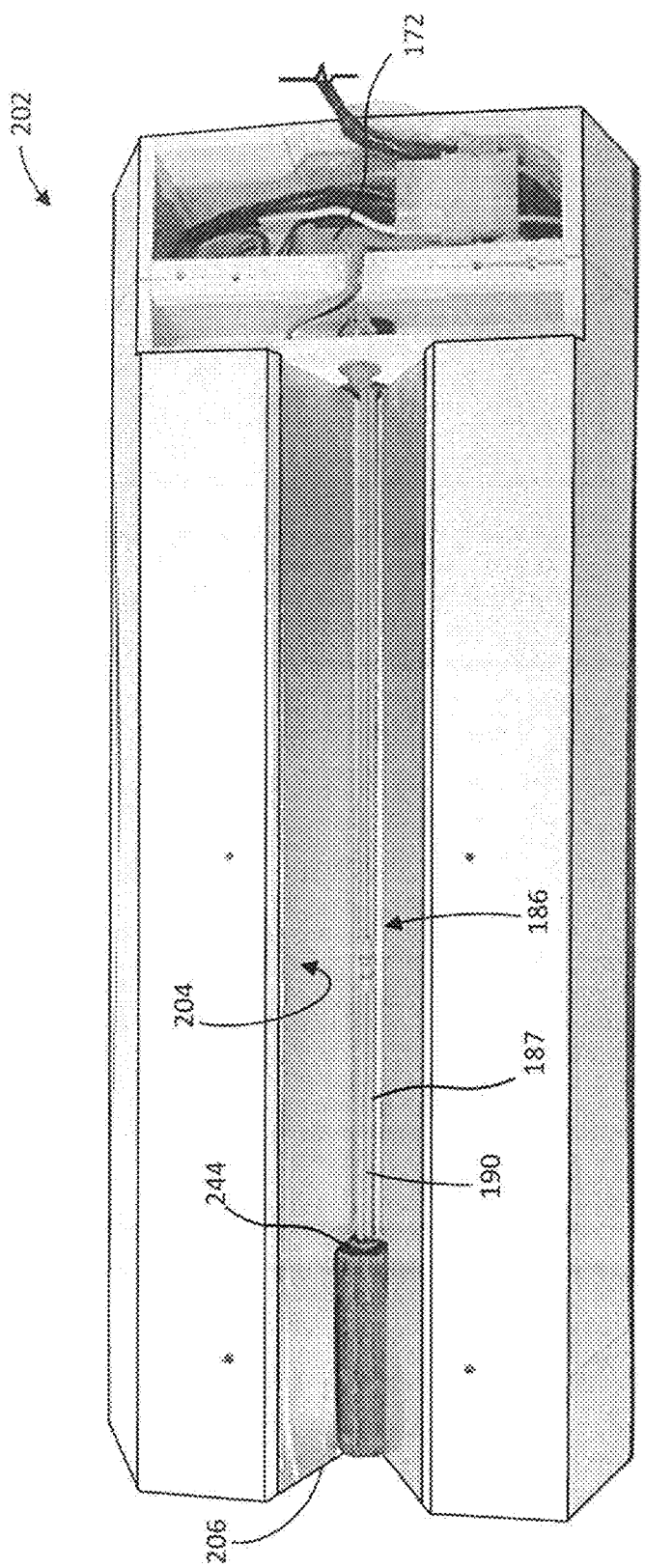

In the example illustrated, the dispensing element 186 is movable between at least one first position for receiving inoculum from the cartridge chamber 154 and at least one second position for depositing the received inoculum into the first bee pathway 112. Referring to FIGS. 8 to 10, in the example illustrated, the dispensing element 186 is movable between the first and second position by an electric motor 188 mounted in the body 104, and the dispensing element 186 includes a rotor 187 driven by the electric motor 188. In the example illustrated, the rotor includes a plurality of rotor grooves 190 for receiving the inoculum when in communication with the cartridge chamber 154. The inoculum is released from the grooves 190 into the first bee pathway 112 during rotation of the rotor 187.

The motor 188 and the rotor 187 can in some examples be removable from the housing. This can allow for removal, cleaning, and/or inspection of the motor 188 and the rotor 187.

Referring again to FIG. 3, in the example illustrated, the cartridge chamber 154 is sized to store a cartridge chamber volume of the inoculum. The inoculum passage 136 has an inoculum passage volume 138 (also referred to as a reservoir volume 138) intermediate the dispensing element 186 and the cartridge chamber 154. In the example illustrated, the reservoir volume 138 is less than the chamber volume to facilitate retention of at least some inoculum in the cartridge chamber 154 when the cartridge 150 is installed. This may help to, for example, maintain freshness of the inoculum.

Referring to FIGS. 6 and 7, the cartridge 150 includes a casing 152 defining the cartridge chamber 154. In the example illustrated, the cartridge casing 152 extends along a longitudinal cartridge axis 158. When the cartridge 150 is installed in the body 104, the cartridge axis 158 is generally parallel with the horizontal second axis 110 of the body 104. In the example illustrated, the cartridge chamber 154 has a cartridge chamber length 164 extending along the cartridge axis 158. When the cartridge 150 is installed, the cartridge chamber length 164 can extend over at least 75% of the pathway width 142. In the example illustrated, the cartridge chamber length 164 extends over generally an entirety of the first pathway width 142 when the cartridge is installed. This can facilitate generally uniform distribution of the inoculum across the first bee pathway 112.

The cartridge 150 further includes a cartridge port 156 in the casing 152. The cartridge port 156 is in communication with the cartridge chamber 154 for permitting passage of the inoculum out from the cartridge chamber 154. The inoculum passage second end is open to chamber 154 via the cartridge port 156.

In the example illustrated, the cartridge port 156 has a port length 165 extending along the cartridge axis 158. The port length 165 is generally equal to the cartridge chamber length 164. In the example illustrated, the cartridge port 156 has a port width 166 (FIG. 6) that is generally constant along the port length 165.

Referring to FIG. 7, prior to installation in the body 104, the cartridge 150 includes a releasable seal 160 sealing the cartridge port 156 (and the cartridge chamber 154) to prevent dispensing (release) of the inoculum prior to installation of the cartridge 150. In the example illustrated, the seal 160 includes a seal layer 162 attached to the casing 152 over the cartridge port 156. In the example illustrated, the seal 160 further includes a seal tab 163 fixed to and extending from the seal layer 162 for permitting a user to grasp and peel the seal 160 apart from the cartridge 150 to open the cartridge port 156 during installation. The seal layer 162 can include, for example, a metal foil heat sealed to the casing 152 over the cartridge port 156.

Referring to FIGS. 6 and 7, in the example illustrated, the cartridge casing 152 includes a cartridge top wall 170 opposite the cartridge port 156, and a cartridge sidewall 172 extending from the top wall 170 to the cartridge port 156. The cartridge top wall 170 and the cartridge sidewall 172 enclose the cartridge chamber 154. In the example illustrated, the cartridge sidewall 172 includes laterally spaced apart first and second cartridge sidewall portions 172*a*, 172*b* extending along the cartridge axis 158 between axially spaced apart third and fourth cartridge sidewall portions 172*c*, 172*d* of the sidewall 172. At least one of the first and second cartridge sidewall portions 172*a*, 172*b* can include a tapered inner surface 174 tapering laterally inwardly from the cartridge top wall 170 to the cartridge port 156 for directing the inoculum in the cartridge chamber 154 toward the cartridge port 156 when the cartridge 150 is installed. In the example illustrated, each of the first and second cartridge sidewall portions 172*a*, 172*b* include a respective tapered inner surface 174. In the example illustrated, the cartridge port 156 is bounded laterally by the first and second cartridge sidewall portions 172*a*, 172*b*, and axially by the third and fourth cartridge sidewall portions 172*c*, 172*b*. In the example illustrated, the sidewall 172 includes a top edge 176 adjacent the top wall 170 and a bottom edge 178 opposite the top edge 176. The bottom edge 178 of the cartridge sidewall 172 circumscribes the cartridge port 156.

Referring to FIG. 7, in the example illustrated, the cartridge casing 152 includes at least one intermediate wall 180 axially intermediate the third and fourth cartridge sidewall portions 172*c*, 172*d*. The intermediate wall 180 separates the cartridge chamber 154 into a plurality of axially spaced apart chamber portions. This may facilitate uniform distribution of the inoculum within the cartridge chamber 154 along the cartridge port length 165. In the example illustrated, the casing 152 includes one intermediate wall 180 that separates the cartridge chamber into a chamber first portion 154*a* and an axially spaced apart chamber second portion 154*b*.

Referring again to FIGS. 1 to 3, the body 104 includes an inoculum housing 202 mountable to the frame 144. The housing 202 is slidable into the frame 144 along the horizontal first axis 108 from the front side 104*b* of the body 104 to mount the housing 202 to the frame 144. Referring to FIGS. 8 to 10, in the example illustrated, the dispenser 130 is mounted in the inoculum housing 202.

In the example illustrated, the body 104 includes a receptacle 204 for receiving the inoculum cartridge 150. The cartridge 150 is seated within the receptacle 204 when installed. In the example illustrated, the receptacle 204 is provided in the inoculum housing 202. The receptacle 204 is positioned above the first bee pathway 112 when the housing 202 is mounted to the frame 144. In the example illustrated, the receptacle 204 is in communication with the dispenser 130. In the example illustrated, the receptacle 204 has an upper volume 204*a* (FIG. 9) in which the cartridge 150 is seated when installed, and a lower volume 204*b* (FIG. 9) below the upper volume 204*a*. In the example illustrated, the inoculum passage 136 includes the lower volume 204*b* of the receptacle 204.

In the example illustrated, the inoculum housing 202 includes a receptacle opening 206 in communication with the receptacle 204. The cartridge 150 is horizontally slidable into the receptacle 204 through the receptacle opening 206 for installation and removal of the cartridge 150 when the body 104 is mounted to the hive 102.

Referring to FIGS. 4A and 4B, in the example illustrated, the inoculum housing 202 is reconfigurably mountable to the frame 144 in either one of a left-side configuration (FIG. 4A) and a right-side configuration (FIG. 4B). When the housing 202 is mounted in the left-side configuration, the receptacle opening 206 is accessible from the left side 104*c* of the body 104 to permit installation and removal of the cartridge 150 from the left side 104*c* of the body 104 when the body 104 is mounted to the hive 102. When the housing 202 is mounted in the right-side configuration, the receptacle opening 206 is accessible from the right side 104*d* of the body 104 to permit installation and removal of the cartridge 150 from the right side 104*d* of the body 104 when the body 104 is mounted to the hive 102. This may facilitate more convenient installation and replacement of cartridges in hive systems in which access to one of the left-side and the right-side of the body is obstructed, such as, for example, hive systems in which inoculation systems are mounted side-by-side in close proximity.

In the example illustrated, the housing 202 can be reconfigured from one to the other of the left-side configuration and the right-side configuration by sliding the housing 202 along the horizontal first axis 108 out from the frame 144 from the front side 104*b* of the body 104, rotating the housing 180 degrees about a housing axis parallel to the vertical axis 106, and sliding the housing 202 back into the frame 144 along the horizontal first axis 108 from the front side 104*b* of the body 104.

Referring to FIGS. 9 and 10, in the example illustrated, the inoculum housing 202 includes a housing bottom wall 208, a housing top wall 210 opposite the housing bottom wall 208, and a housing sidewall 212 extending between the housing bottom and top walls 208, 210. In the example illustrated, the receptacle opening 206 is provided in the housing sidewall 212. In the example illustrated, the first pathway ceiling 112b is fixed relative to the housing 202. In the example illustrated, the first pathway ceiling 112b includes a bottom surface of the housing bottom wall 208. In the example illustrated, the inoculum passage 136 extends through the housing bottom wall 208. In the example illustrated, the housing top wall 210 serves as the landing board 128.

In the example illustrated, the housing sidewall 212 includes a first sidewall outer surface 212a, a second sidewall outer surface 212b opposite the first sidewall outer surface 212a, and opposed third and fourth sidewall outer surfaces 212c, 212d extending between the first and second sidewall outer surfaces 212a, 212b. The first and second sidewall outer surfaces 212a, 212b are spaced apart along the horizontal first axis 108 when the housing 202 is mounted to the frame 144, and the third and fourth sidewall outer surfaces 212c, 212d are spaced apart along the horizontal second axis 110 when the housing 202 is mounted to the frame 144. In the example illustrated, the receptacle opening 206 is provided in the third sidewall outer surface 212c.

One or more portions of the housing sidewall 212 can be removable (e.g. the portion including sidewall outer surface 212d), in order to allow for removal of or access to motor 188 and/or rotor 187.

Referring to FIGS. 3 and 4A, in the example illustrated, when the housing 202 is mounted to the frame 144 in the left-side configuration, the first sidewall outer surface 212a is directed toward the rear side 104a of the body 104, the second sidewall outer surface 212b is directed toward the front side 104b of the body 104, the third sidewall outer surface 212c is directed toward the left side 104c of the body 104, and the fourth sidewall outer surface 212d is directed toward the right side 104d of the body 104. Referring to FIG. 4B, in the example illustrated, when the housing 202 is mounted to the frame 144 in the right-side configuration, the first sidewall outer surface 212a is directed toward the front side 104b of the body 104, the second sidewall outer surface 212b is directed toward the rear side 104a of the body 104, the third sidewall outer surface 212c is directed toward the right side 104d of the body 104, and the fourth sidewall outer surface 212d is directed toward the left side 104c of the body 104.

In the example illustrated, the second bee pathway 118 is defined by a second pathway floor 118a, a second pathway ceiling 118b above the second pathway floor 118a, and a pair of spaced apart second pathway sidewalls 118c, 118d extending between the second pathway floor and ceiling 118a, 118b. In the example illustrated, the second pathway floor 118a is fixed relative to the housing 202. When the housing 202 is mounted to the frame 144 in the left-side configuration, the second pathway floor 118a includes the first sidewall outer surface 212a. When the housing 202 is mounted to the frame 144 in the right-side configuration, the second pathway floor 118a includes the second sidewall outer surface 212b.

Referring to FIG. 3, in the example illustrated, the housing top wall 210 has an outer surface first portion 210a adjacent the first sidewall outer surface 212a, and an outer surface second portion 210b adjacent the second sidewall outer surface 212b. When the housing 202 is mounted in the left-side configuration, the second pathway floor 118a includes the outer surface first portion 210a of the housing top wall 210. In the example illustrated, the outer surface second portion 210b of the housing top wall serves as an exterior landing surface of the landing board 128 when the housing 202 is mounted in the left-side configuration. When the housing 202 is mounted in the right-side configuration, the second pathway floor 118a includes the outer surface second portion 210b of the housing top wall 210. In the example illustrated, the outer surface first portion 210a serves as the exterior landing surface of the landing board 128 when the housing 202 is mounted in the right-side configuration.

Referring still to FIG. 3, in the example illustrated, the frame 144 includes a base 216 and a frame upper portion 218 supported by the base 216. The frame upper portion 218 overhangs at least a portion of the housing 202 when the housing is mounted to the frame 144. In the example illustrated, the second pathway ceiling 118b and sidewalls 118c, 118d are fixed to the frame upper portion 218.

In the examples illustrated, the inoculum housing 202 is supported on the base 216 when mounted to the frame 144. At least a portion of the base 216 is below the housing 202 when the housing 202 is mounted. In the example illustrated, the tray 146 is slidably mounted to the base 216. In the example illustrated, the first pathway sidewalls 112c, 112d are fixed relative to the base 216.

Figure 1B:
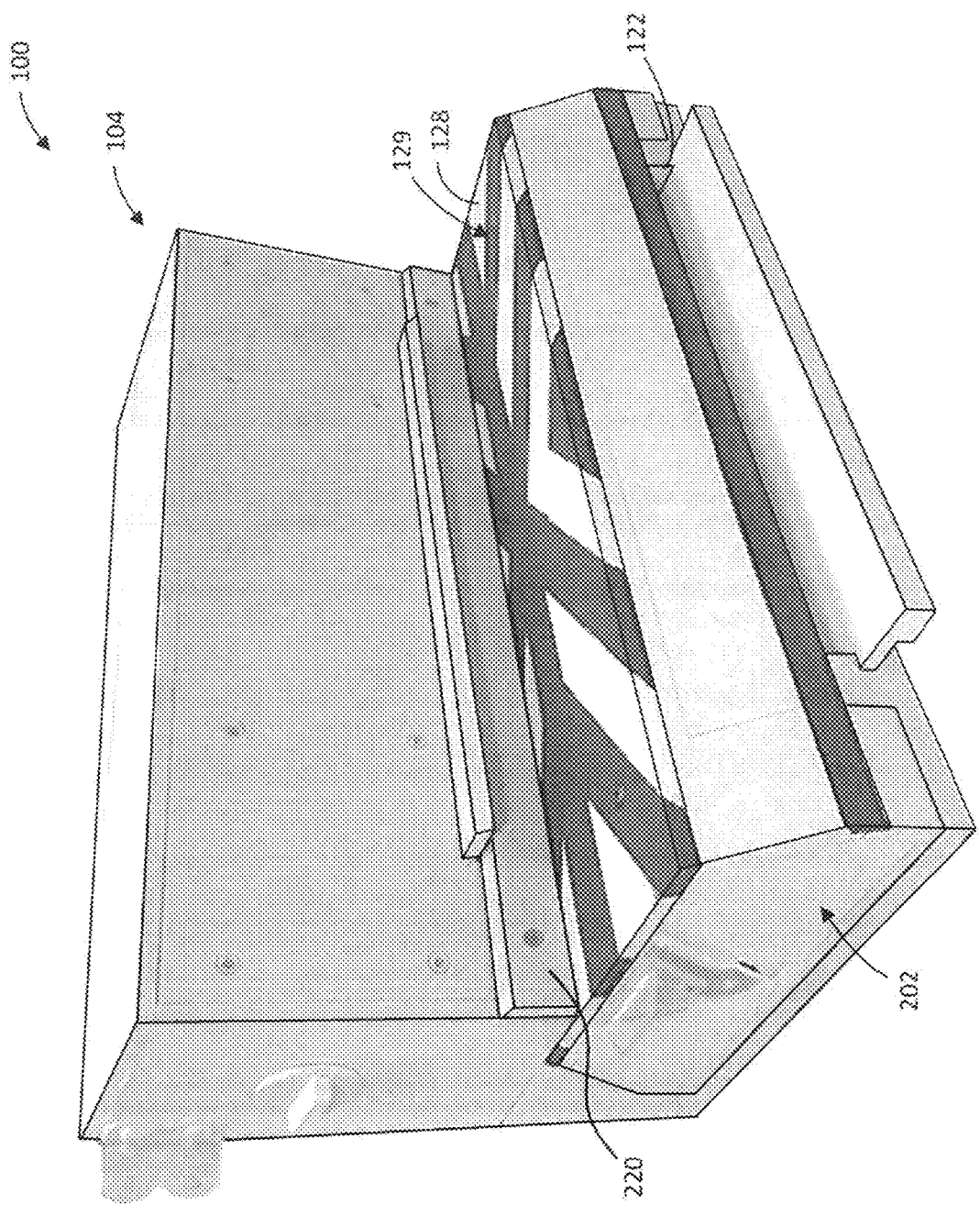

Referring to FIGS. 1B and 2, in the example illustrated, the system 100 includes a blocking member 220 movable between an unblocked configuration (FIG. 1A) and a blocked configuration (FIG. 1B). Referring to FIG. 1A, when the blocking member 220 is in the unblocked configuration, the blocking member 220 is clear of the second bee pathway 118 to permit passage of bees through the second bee pathway 118. When the blocking member 220 is in the unblocked configuration, the second bee pathway 118 serves as the hive entrance for the hive 102, and the first bee pathway 112 serves as the hive exit for the hive 102 to facilitate inoculation of bees exiting the hive 102 (e.g. so that the bees can deliver an inoculum to a target plant).

The blocking member 220 can, for example, be moved from the unblocked to the blocked configuration by screwing or snapping the blocking member to the body 104.

Referring to FIG. 1B, in the example illustrated, when the blocking member 220 is in the blocked configuration, the blocking member 220 obstructs the second bee pathway 118 to block passage of bees through the second bee pathway 118 and compel bees to use the first bee pathway 112 to enter the hive 102. When the blocking member 220 is in the blocked configuration, the first bee pathway 112 serves as both the hive exit and the hive entrance for the hive 102, to facilitate inoculation of bees entering the hive 102 (e.g. so that the bees can deliver an inoculum to the hive). In the example illustrated, the blocking member 220 covers the second opening 124 in the body 104 when in the blocked configuration. The blocking member 220 is clear of the second opening 124 when in the unblocked configuration.

Figures 11, 12, 13:
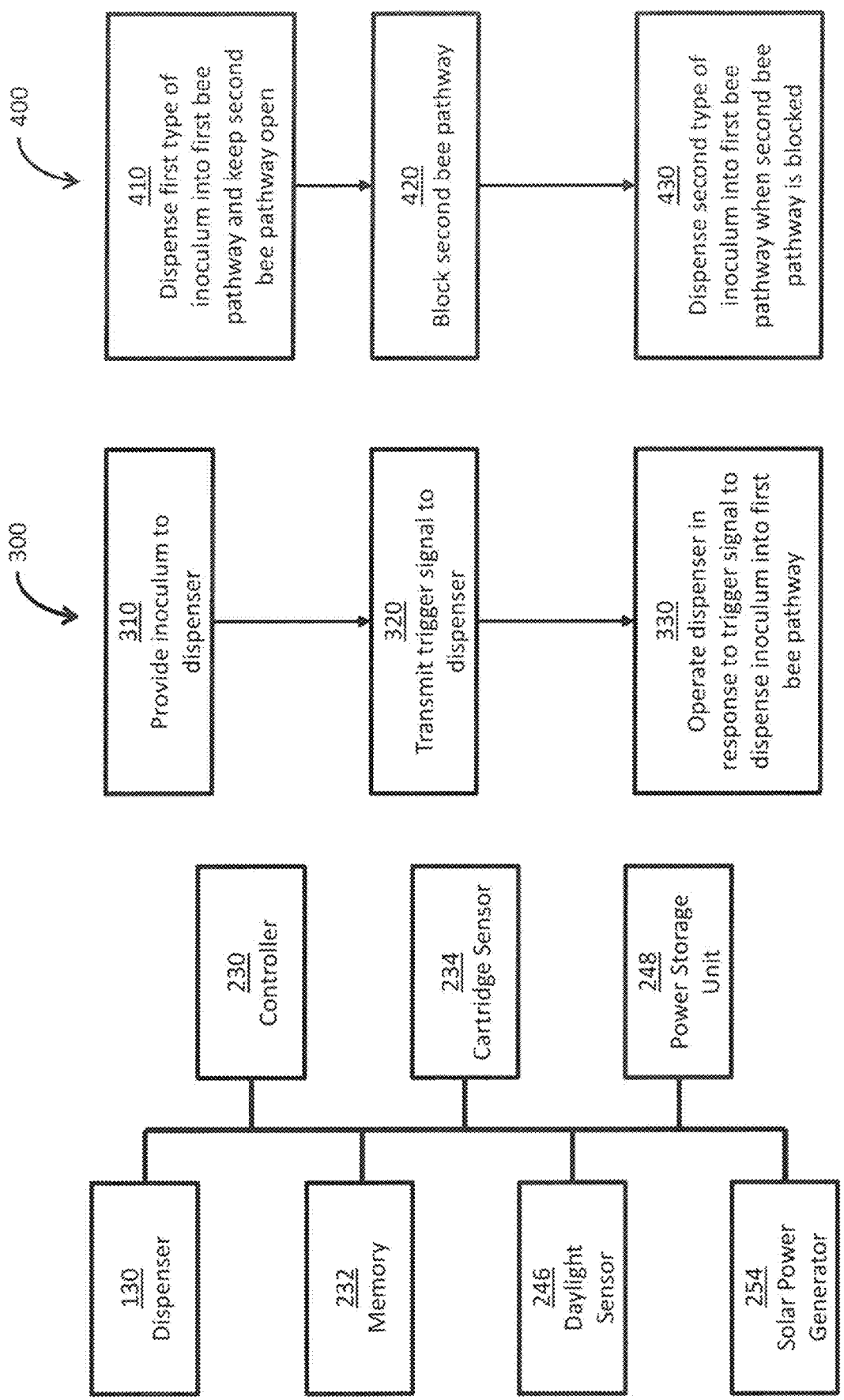

Referring to FIG. 11, in the example illustrated, the system includes a controller 230 for controlling operation of the dispenser 130. The controller can include at least one computer processor, and one or more communication interfaces for providing communication between the processor and other system components.

In the example illustrated, the controller is operable to transmit a trigger signal. In the example illustrated, the dispenser 130 is in communication with the controller 230 for receiving the trigger signal. The dispenser 130 is operable to dispense an amount of the inoculum into the first bee pathway 112 in response to receiving the trigger signal from the controller 230 to dust bees passing through the first bee pathway 112 with the inoculum. In the example illustrated, the controller 230 is housed in a controller compartment 231 (FIG. 2) in the frame upper portion 218.

In the example illustrated, the controller 230 is operable to transmit the trigger signal to the dispenser 130 according to, for example, a dispensing schedule. The dispensing schedule can include, for example, time intervals at which to transmit the trigger signal to the dispenser 130. This can provide for periodic dispensing of the inoculum into the first pathway, and can facilitate more efficient use of inoculum and operation of the system. The dispensing schedule can alternatively or in addition include a daily time-period during which to transmit the trigger signal to the dispenser 130. The dispensing schedule can be stored on, for example, computer-readable memory 232 in communication with the controller 230.

In the example illustrated, the system further includes a cartridge sensor 234 in communication with the controller 230 for detecting installation of the inoculum cartridge 150 in the receptacle 204. In the example illustrated, the controller 230 is operable to transmit the trigger signal to the dispenser 130 according to the dispensing schedule in response to the cartridge sensor 234 detecting installation of the cartridge 150. Referring to FIGS. 9 and 10, in the example illustrated, the cartridge sensor 234 includes a switch 236 that is actuated when the cartridge 150 is installed in the receptacle 204. In the example illustrated, the switch includes a push button switch mounted to an internal surface of the receptacle 204 opposite the receptacle opening 206.

Referring to FIGS. 5 and 7, in the example illustrated, the cartridge 150 includes an actuator 238 mounted to the casing 152 for activating operation of the dispenser 130 when the cartridge 150 is installed. In the example illustrated, the actuator 238 activates the switch 236 of the cartridge sensor 234 when the cartridge 150 is installed in the receptacle 204. In the example illustrated, the actuator 238 includes a protuberance 240 on an outer surface of the casing 152. The protuberance 240 protrudes from an axial endface of the casing 152, and in the example illustrated, the protuberance 240 engages the switch 236 of the cartridge sensor 234 to activate the switch 236 when the cartridge 150 is installed in the receptacle 204 (see FIG. 4A).

Referring to FIG. 4A, in the example illustrated, the cartridge 150 includes a catch 242 (see also FIG. 7) fixed to the casing 152 for engagement with an engagement surface 244 (see also FIG. 10) fixed to the housing 202 when the cartridge 150 is installed. Engagement between the catch 242 and the engagement surface 244 can maintain the cartridge 150 in an installed position, and can maintain engagement between the protuberance 240 and the switch 236 of the cartridge sensor 234 when the cartridge 150 is installed.

In some examples, the cartridge sensor 234 can be operable to identify a cartridge characteristic of the cartridge 150, and the controller 230 can be operable to select the dispensing schedule from a plurality of predefined dispensing schedules based on the cartridge characteristic. In some examples, the cartridge characteristic can correspond to a type of inoculum stored in the cartridge 150 and/or a configuration of components of the cartridge 150, such as, for example, the relative position and/or type of actuator 238.

For example, the system can include a cartridge sensor having a plurality of switches, with each switch corresponding to a distinct dispensing schedule. The cartridge actuator of a first cartridge can be configured to activate a first switch of the plurality of switches when the first cartridge is installed. The first switch can correspond to a first dispensing schedule specific to a first inoculum stored in the first cartridge. The first inoculum may include, for example, a plant treatment agent.

The controller can be operable to transmit the trigger signal according to the first dispensing schedule. The first dispensing schedule may include, for example, a first daily time-period during which to dispense the first inoculum. The first daily time-period may begin at dawn and end at dusk (also referred to as a "dawn to dusk" dispensing schedule). This may, for example, facilitate inoculation of bees leaving the hive, so that the bees may transport the plant treatment agent to a crop.

The cartridge actuator of a second cartridge can be configured to activate a second switch of the plurality of switches when the second cartridge is installed. The second switch can correspond to a second dispensing schedule specific to a second inoculum stored in the second cartridge. The second inoculum can be different from the first inoculum. The second inoculum may include, for example, a bee or hive treatment agent. An example of a bee treatment agent includes a miticide such as veromite.

The controller can be operable to transmit the trigger signal according to the second dispensing schedule when the second switch is activated. The second dispensing schedule may include, for example, a second daily time-period during which to dispense the second inoculum. The second daily time-period can be different from the first daily time-period, and can, for example, begin at high noon and end at dusk (i.e. afternoon to early evening, also referred to as a "late day" dispensing schedule). This may, for example, facilitate inoculation of bees returning to the hive and may help inhibit spread of mites within the hive.

In some examples, the dispensing schedules may vary based on environmental factors, such as, for example, daylight intensity. Referring to FIG. 11, the system can include an optional daylight sensor 246 for sensing an intensity of daylight, and the controller 230 can be operable to transmit the trigger signal to the dispenser 130 in response to the daylight sensor sensing a predefined intensity of daylight. The predefined intensity of daylight can correspond to, for example, the intensity of daylight at dawn and/or the intensity of daylight at dusk.

Referring still to FIG. 11, in the example illustrated, the system 100 includes a power storage unit 248 for supplying power to components of the system 100, such as, for example, the controller 230 and/or the dispenser 130. The power storage unit 248 can include at least one battery 250 (see FIG. 3). In the example illustrated, the battery 250 is housed in a battery compartment 252 in the frame upper portion 218. In the example illustrated, the system 100 further includes a solar power generator 254 for charging the power storage unit 248. The solar power generator 254 can include a plurality of solar cells in communication with the battery 250.

Referring to FIG. 12, a method 300 for operating the system 100 is shown. At 310, the cartridge 150 is installed in the system 100 to provide inoculum to the dispenser 130. Prior to installation of the cartridge 150, the cartridge seal 160 is released. In the example illustrated, the cartridge seal 160 can be released prior to insertion of the cartridge 150 into the receptacle 204 by peeling the seal layer 162 apart from the casing 152. In some examples, a seal release member may be provided in or adjacent the receptacle 204 for releasing (e.g., peeling, tearing, or cutting) the seal layer 162 during insertion of the cartridge 150 into the receptacle 204.

Installation of the cartridge 150 actuates the switch 236, which signals to the controller 230 that the cartridge has been installed. At 320, the controller 230 transmits a trigger signal to the dispenser 130.

In some examples, prior to transmitting the trigger signal, the controller can select a dispensing schedule from a plurality of predefined dispensing schedules. The dispensing schedule can be selected based on a characteristic of the installed cartridge 150. For example, if the inoculum in the installed cartridge contains a plant treatment agent, a "dawn to dusk" dispensing schedule can be selected, so that the inoculum is dispensed as the bees leave the hive (as discussed above, such cartridges can have a cartridge actuator that is configured to activate a first switch of the cartridge sensor, which signals to the controller to dispense according to a first dispensing schedule). Alternatively, if the inoculum in the installed cartridge is a hive treatment agent, a "late day" dispensing schedule can be selected, so that the inoculum is dispensed as the bees enter the hive (as discussed above, such cartridges can have a cartridge actuator that is configured to activate a second switch of the cartridge sensor, which signals to the controller to dispense according to a second dispensing schedule).

After the dispensing schedule is selected, the trigger signal can be transmitted during step 320 according to the dispensing schedule. In some examples, the trigger signal is transmitted at time intervals set by the dispensing schedule. The time intervals can be, for example, 30 seconds or more. In some examples, the time intervals are at least 1 minute. In some examples, the time intervals are between 1 minute and 5 minutes. In some examples, the time intervals are about 90 seconds, so that an amount of the inoculum is dispensed every 90 seconds. In some examples, the trigger signal can be transmitted during a daily time period set by the dispensing schedule, and/or the trigger signal can be transmitted based on environmental factors defined by the dispensing schedule, such as, for example, a predefined intensity of daylight.

At 330, the dispenser dispenses an amount of the inoculum into the bee pathway 112 in response to receiving the trigger signal to dust bees passing through the bee pathway with the inoculum. The cartridge chamber 154 can be sized to store an amount of inoculum for approximately two weeks of dispensing according to the dispensing schedule. After the inoculum is depleted from the cartridge chamber 154, the depleted cartridge 150 can be removed from the receptacle 204, and another cartridge 150 storing inoculum can be installed in the receptacle 204 for further dispensing of the inoculum. The depleted cartridge 150 can be discarded, or returned to a suitable facility for recycling and/or refilling and resealing for subsequent use.

Referring to FIG. 13, a method 400 for inoculating honey bees passing through the system 100 is shown. At 410, a first inoculum is dispensed into the first bee pathway 112, e.g. from a first cartridge, to dust bees exiting the hive via the first bee pathway 112 with the first inoculum. During dispensing of the first inoculum, the second bee pathway 118 is unblocked and serves as a hive entrance. The first inoculum can include, for example, a plant treatment agent, such as that described in U.S. Pat. No. 9,380,777. The first inoculum can be dispensed at step 410 during a daily first time-period set by a first dispensing schedule. The daily first time-period can begin at dawn and end at dusk as determined by, for example, a daylight sensor. Step 410 can occur, for example, during pollination season (e.g. during the summer). This can facilitate inoculation of bees leaving the hive in the morning, and transmittal of the plant treatment agent from the bees to plants with which the inoculated bees interact.

At 420, the second bee pathway 118 is blocked to compel bees to use the first bee pathway 112 to enter the hive 102. This may optionally be done manually, for example, by a beekeeper affixing the blocking member 220 to the frame 144 over the second opening 124 to obstruct the second bee pathway 118. At this time, the first cartridge may be removed from the system, and a second cartridge containing a second inoculum may be inserted.

At 430, the second inoculum is dispensed into the first bee pathway 112 when the second bee pathway 118 is blocked to inoculate bees entering the hive via the first bee pathway 112 with the second inoculum. The second inoculum is different from the first inoculum. The second inoculum can include, for example, a bee or hive treatment agent, such as a miticide. The second inoculum can be dispensed at step 430 during a second daily time-period set by a second dispensing schedule different from the first dispensing schedule (as discussed above, the second cartridge can activate a second switch of the cartridge sensor, which signals to the controller to dispense according to the second dispensing schedule). The second daily time-period can begin in the afternoon (i.e. a "late day" dispensing schedule), as determined by a daylight sensor. Steps 420 and 430 can occur, for example, outside of pollination season (e.g. during spring and fall). This can facilitate inoculation of bees returning to the hive in the evening and to inhibit spread of, for example, mites within the hive 102.

Figure 14:
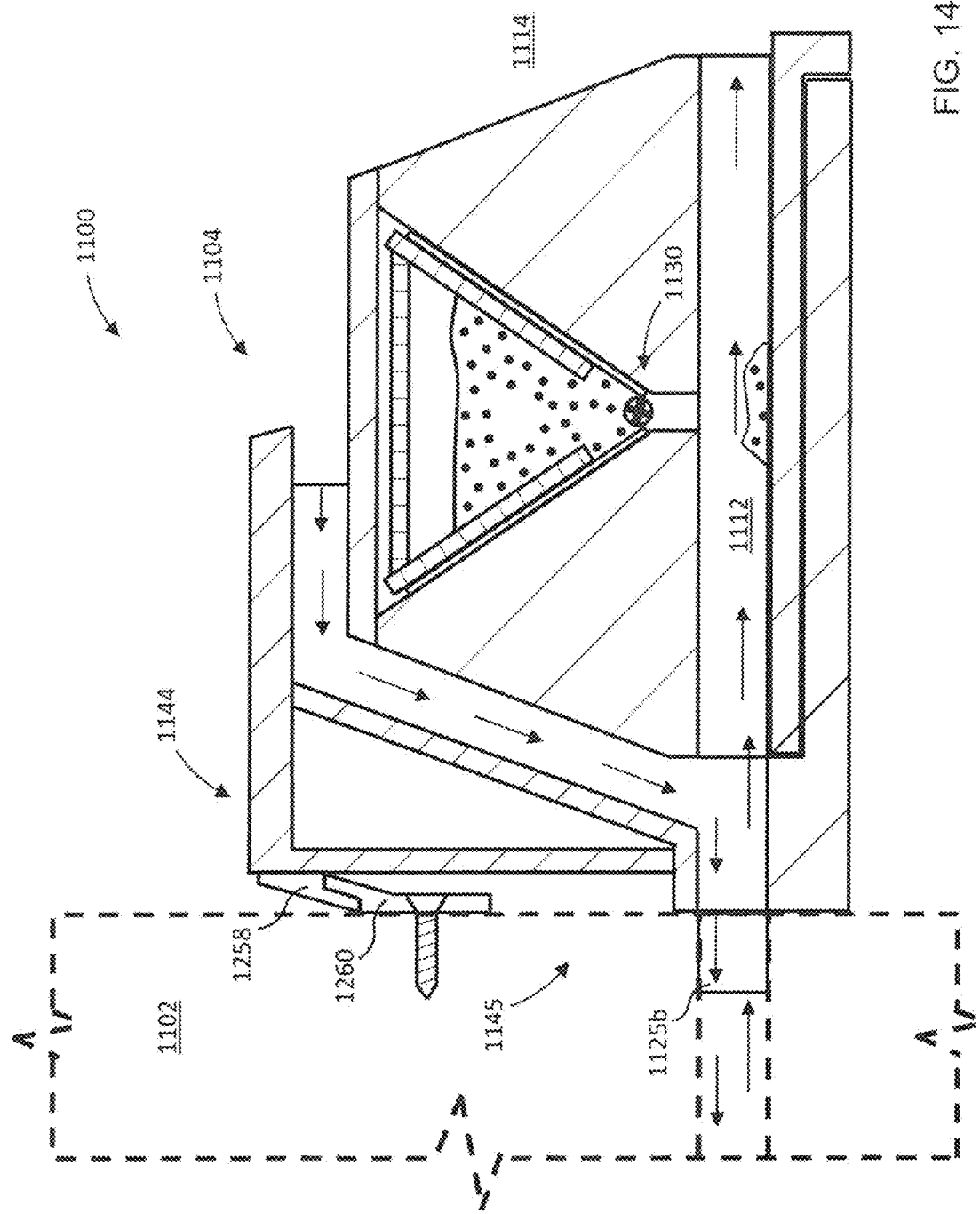

Referring to FIG. 14, another inoculation system 1100 for a bee hive is illustrated schematically. The system 1100 has similarities to the system 100, and like features are identified by like reference characters, incremented by 1000.

Figure 17A:
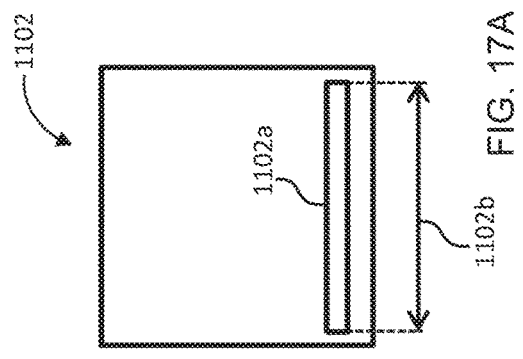
Figure 17B:
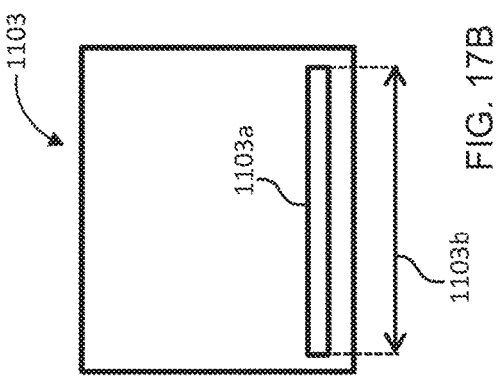

In the example illustrated, the system 1100 is adjustable for installation in either one of a first bee hive 1102 having a first hive opening 1102a of a first opening width 1102b (FIG. 17A), and a second bee hive 1103 having a second hive opening 1103a of a second opening width 1103b different from the first opening width 1102b (FIG. 17B).

Figure 16:
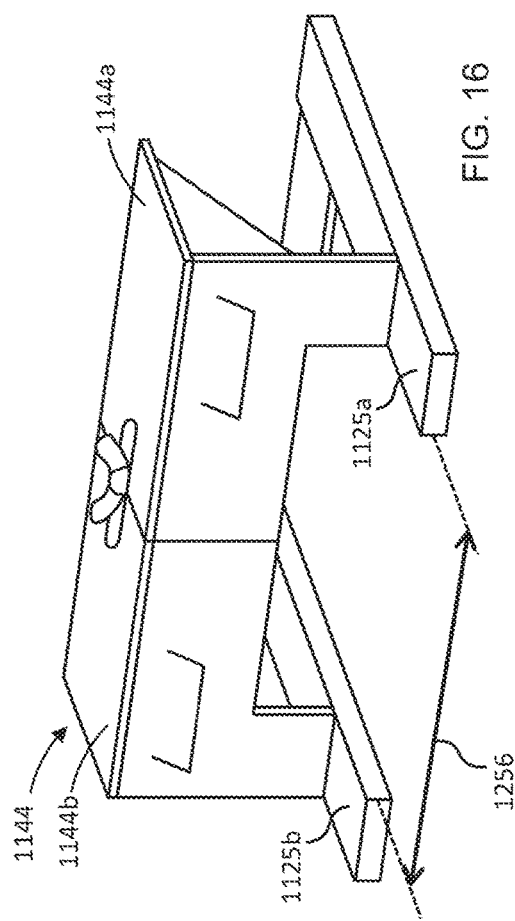

In the example illustrated, the system 1100 includes a body 1104 having a frame 1144 and a pair of adjustable installation posts 1125a, 1125b mounted to and protruding from a rear side 1145 of the frame 1144 (see also FIG. 16). Referring to FIG. 16, the posts 1125a, 1125b are spaced laterally apart from one another by a lateral post spacing 1256. In the example illustrated, the post spacing 1256 is adjustable for accommodating insertion of the installation posts 1125a, 1125b into a respective one of the first hive opening 1102b and the second hive opening 1103b to mount the body 1104 to the one of the first bee hive 1102 and the second bee hive 1103.

Referring to FIG. 14, in the example illustrated, a bee pathway 1112 is provided in the body 1104 laterally intermediate the first and second installation posts 1125a, 1125b to provide passage for bees between an outside environment 1114 and a respective one of the first hive opening 1102b and the second hive opening 1103b when the body 1104 is mounted to the one of the first bee hive 1102 and the second bee hive 1103. In the example illustrated, an inoculum dispenser 1130 is mounted in the body 1104. The dispenser 1130 is operable to dispense an inoculum into the bee pathway 1112 to dust bees passing through the bee pathway 1112 with the inoculum.

Figure 15:
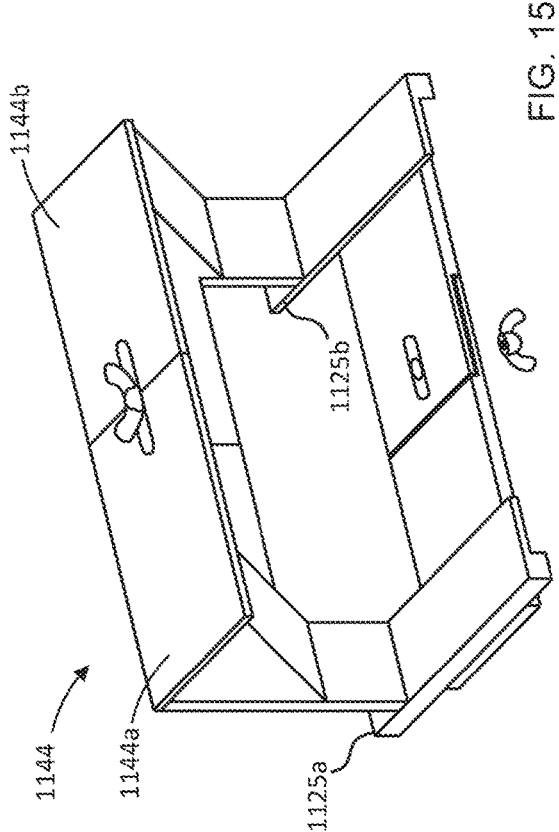

Referring to FIGS. 15 and 16, in the example illustrated, the frame 1144 includes a left-side frame portion 1144*a* supporting a left one of the installation posts (1125*a*), and a right-side frame portion 1144*b* adjustably coupled to the left-side frame portion 1144*a* and supporting a right one of the installation posts (1125*b*). The left-side and right-side portions 1144*a*, 1144*b* of the frame 1144 are laterally slidable relative to one another for adjusting the lateral post spacing 1256.

Referring to FIG. 14, in the example illustrated, the system 1100 includes a first mount 1258 attached to the rear side 1145 of the frame 1144 above the posts 1125*a*, 1125*b*, and a second mount 1260 attachable to an exterior of the first bee hive 1102 (or the second bee hive 1103). When the second mount 1260 is attached to the first bee hive 1102, the second mount 1260 is engageable with the first mount 1258 to removably mount the body 1104 to the first bee hive 1102. In the example illustrated, the first mount 1258 includes a hook and the second mount 1260 includes a catch for holding the hook when attached to the first bee hive 1102. This can facilitate more convenient detachment of the body 1104 from the bee hive by not necessarily requiring removal of fasteners.

Figure 18:
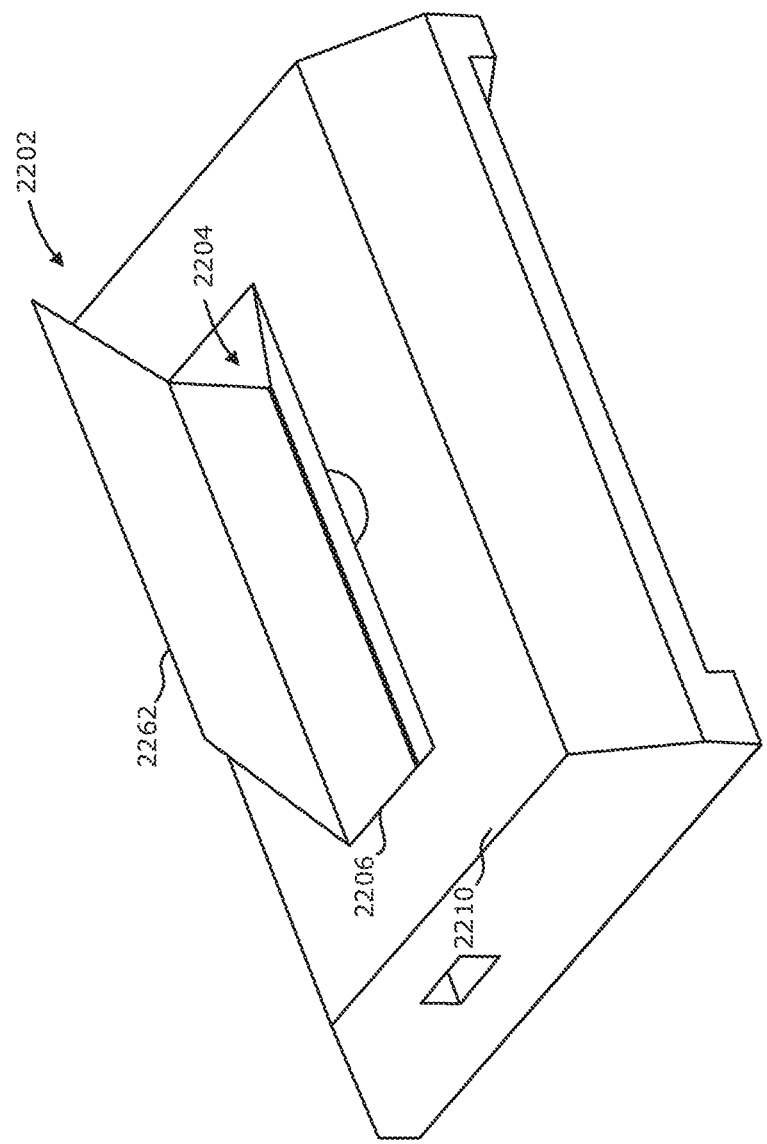

Referring to FIG. 18, an example of another inoculum housing 2202 for use with an inoculation system like the system 100 is illustrated schematically. The housing 2202 has similarities to the housing 202, and like features are identified with like reference characters, incremented by 2000.

In the example illustrated, the housing 2202 includes a receptacle 2204 for receiving an inoculum cartridge, and a lid 2262 movable between an open position (shown in FIG. 18) for providing access to the receptacle 2204 to install (load) and remove (unload) the cartridge, and a closed position for covering the receptacle 2204 and the cartridge when loaded in the receptacle 2204. In the example illustrated, the receptacle 2204 includes a receptacle opening 2206 for inserting the cartridge into the receptacle 2204. In the example illustrated, the receptacle opening 2206 is provided in a housing top wall 2210 of the housing 2202, and the lid 2262 covers the receptacle opening 2206 when in the closed position.

Figure 19:
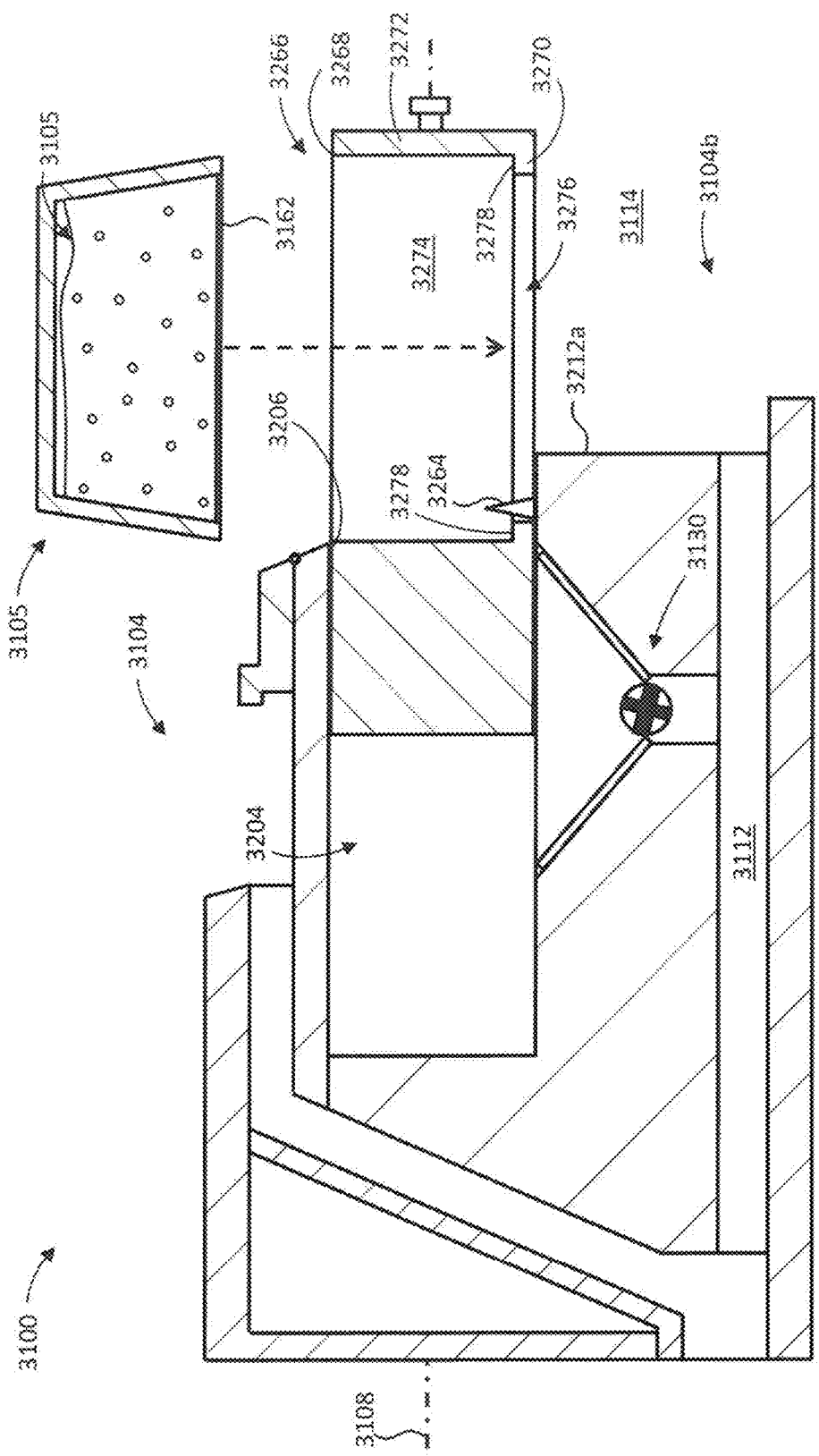

Referring to FIG. 19, another inoculation system 3100 for a bee hive is illustrated schematically. The system 3100 has similarities to the system 100, and like features are identified by like reference characters, incremented by 3000.

In the example illustrated, the system 3100 includes a body 3104 mountable to the hive intermediate a hive opening and an outside environment 3114 external the hive. A first bee pathway 3112 is in the body 3104 for providing passage for bees between the hive opening and the outside environment when the body 3104 is mounted to the hive. The system 3100 further includes an inoculum dispenser 3130 in the body 3104. The dispenser is operable to controllably dispense inoculum into the first bee pathway 3112 to dust bees passing through the first bee pathway 3112 with the inoculum.

In the example illustrated, the system 3100 further includes a removable inoculum cartridge 3150 for installation in the body 3104. The cartridge 3150 includes an internal cartridge chamber 3154 storing inoculum for providing to the dispenser 3130, and a releasable seal layer 3162 sealing the cartridge chamber 3154 to prevent release of the inoculum prior to installation of the cartridge 3150.

In the example illustrated, the system 3100 further includes a receptacle 3204 in the body and in communication with the dispenser 3130 for receiving the cartridge 3150. In the example illustrated, the system 3100 includes a seal release member 3264 in the body 3104 for engagement with the seal layer 3162 (see also FIGS. 19A and 19B) during insertion of the cartridge 3150 into the receptacle 3204 to release the seal layer 3162 for providing the inoculum from the cartridge chamber 3154 to the dispenser 3130.

In the example illustrated, the receptacle 3204 includes a receptacle opening 3206 for inserting the cartridge 3150 into the receptacle 3204. In the example illustrated, the seal release member 3264 is fixed adjacent the receptacle opening 3206. In the example illustrated, the seal release member 3264 comprises a serrated edge extending across the receptacle opening 3206.

In the example illustrated, the receptacle opening 3206 is open to a front sidewall outer surface 3212*a* of the body 3104 directed away from the hive when the body 3104 is mounted to the hive. In the example illustrated, the cartridge 3150 is slidable into the receptacle 3204 along a horizontal first axis 3108 from a front side 3104*b* of the body 3104 to load the cartridge 3150 in the body 3104 (see also FIGS. 19A and 19B).

In the example illustrated, the system 3100 includes a cartridge loader 3266 slidably received in the receptacle 3204. The cartridge loader 3266 is slidable along the horizontal first axis 3108 between a loading position (FIGS. 19 and 19A) for receiving the cartridge 3150, and a dispensing position (FIG. 19B) in which the cartridge 3150 is loaded in the receptacle 3204 for providing the inoculum to the dispenser 3130.

Referring to FIG. 19, in the example illustrated, the cartridge loader 3266 has a loader top surface 3268, a loader bottom wall 3270 below the loader top surface 3268, and a loader sidewall 3272 extending between the loader top surface and the loader bottom wall. The loader 3266 further includes a loader chamber 3274 open to the loader top surface 3268 for receiving the cartridge 3150. The loader chamber 3274 extends between the top surface 3268 and the loader bottom wall 3270. The loader 3266 further includes a bottom wall opening 3276 in the loader bottom wall 3270 for permitting dispensing of the inoculum from the cartridge 3150 to the dispenser 3130. The loader bottom wall 3270 includes a ledge 3278 circumscribing the bottom wall opening 3276 for supporting the cartridge 3150 in the loader chamber 3274.

Figure 19A:
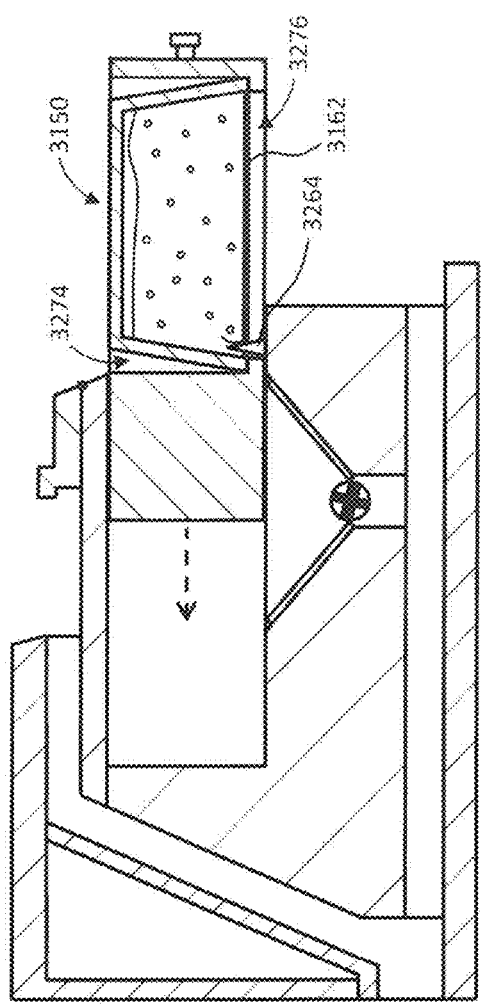
Figure 19B:
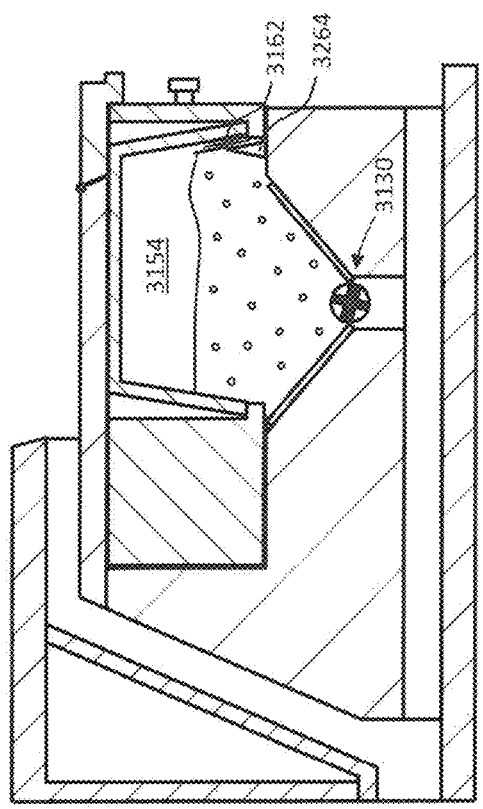
Figure 21:
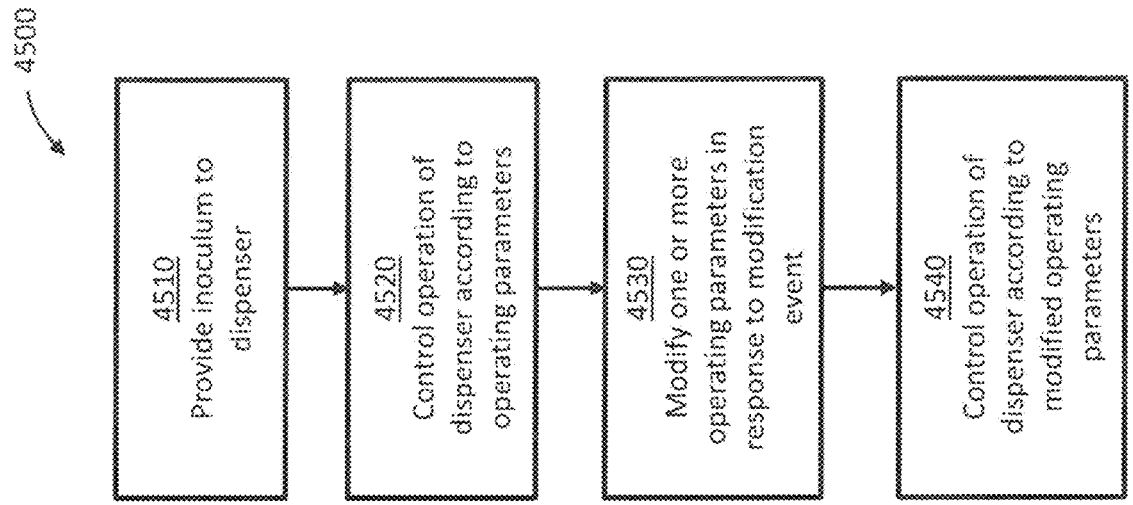

Referring to FIG. 19A, in the example illustrated, the seal release member 3264 is fixed to the body 3104 and protrudes upwardly through the bottom wall opening 3276 and into the loader chamber 3274 for engagement with the seal layer 3162 of the cartridge 3150 when the cartridge 3150 is seated in the loader chamber 3274. In the example illustrated, the seal release member 3264 pierces through the seal layer 3162 of the cartridge 3150 when the cartridge 3150 is seated in the loader chamber 3274.

Figure 20:
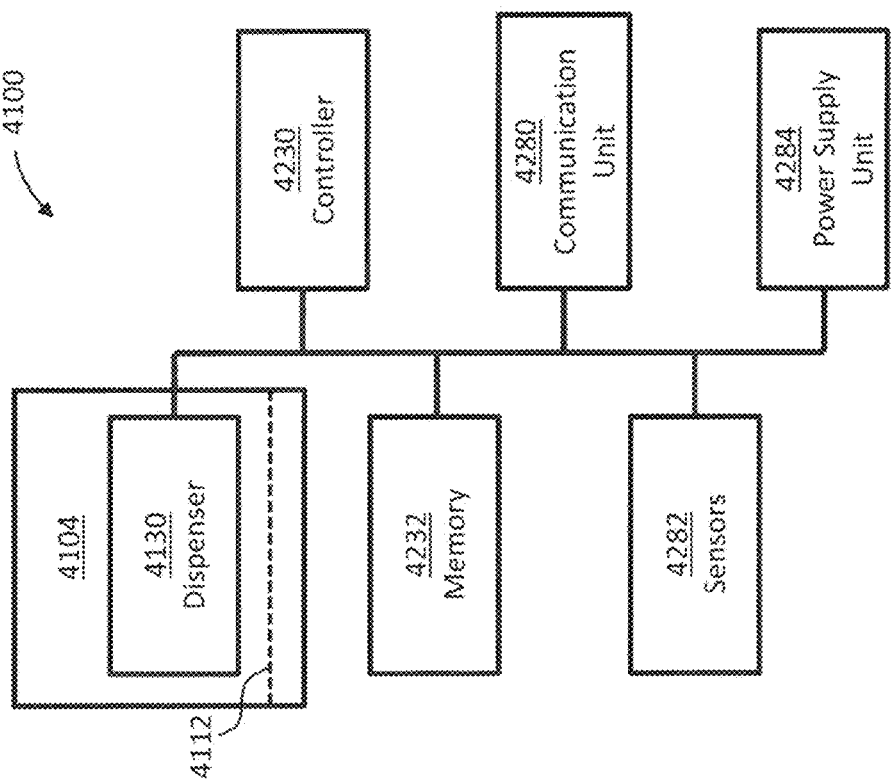
Figure 22:
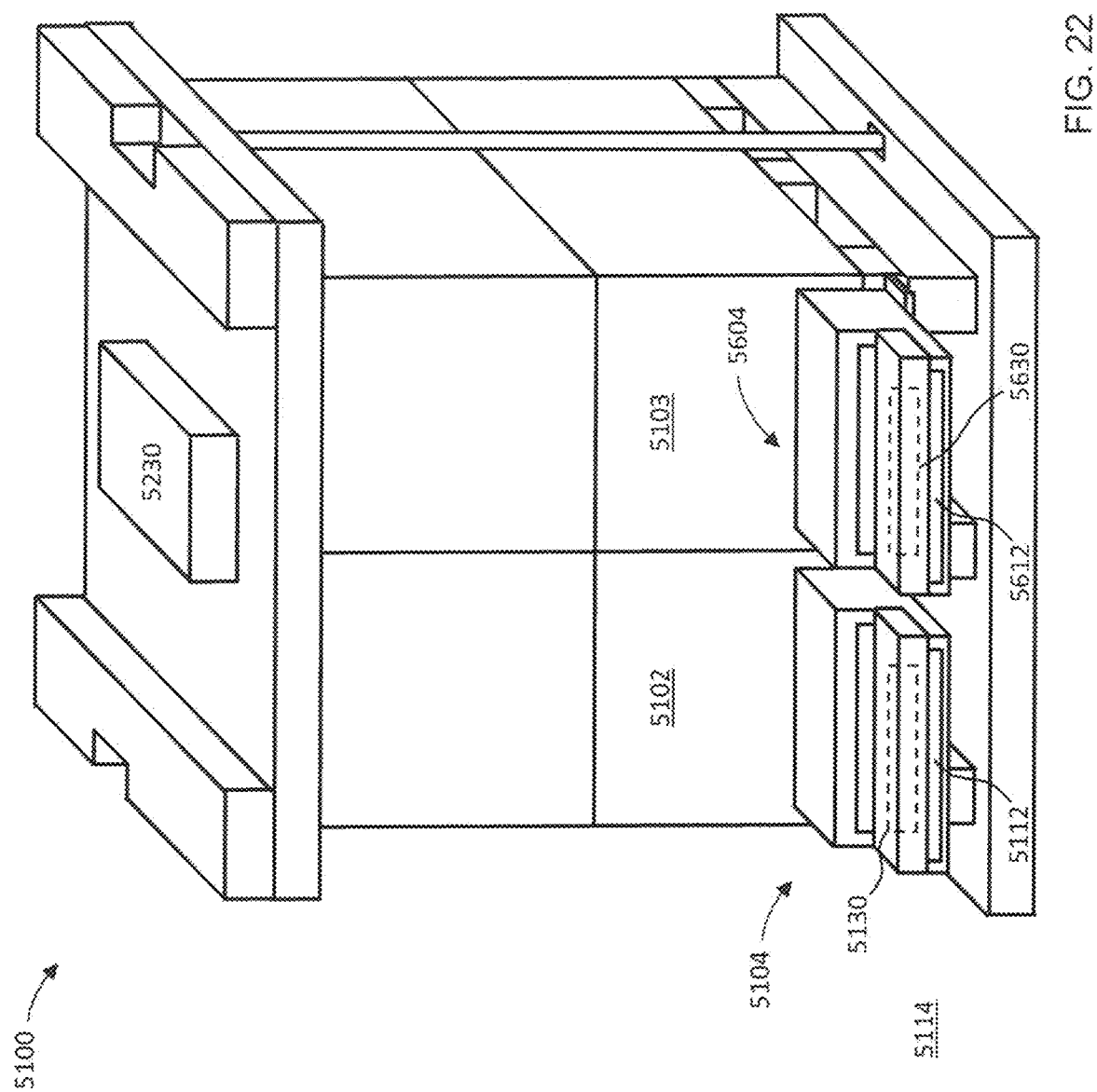

Referring to FIG. 19, in operation, the loader 3266 is moved to the loading position, and the cartridge 3150 is inserted into the loader chamber 3274. Referring to FIG. 19A, during insertion of the cartridge 3150, the seal layer 3162 is impaled on the seal release member 3264. When the cartridge 3150 is in the loader chamber 3274 and the seal layer 3162 is impaled, the loader 3266 is moved from the loading position to the dispensing position. Referring to FIG. 19B, during movement toward the dispensing position, the seal release member 3264 is in engagement with and peels the seal layer 3162. As the seal layer 3162 is peeled, inoculum is released from the cartridge chamber 3154 and provided to the dispenser 3130.

Referring to FIG. 20, another inoculation system 4100 for a bee hive is illustrated schematically. The system 4100 has similarities to the system 100, and like features are identified using like reference characters, incremented by 4000.

In the example illustrated, the system 4100 includes a body 4104 mountable to the bee hive intermediate a hive opening and an outside environment external the hive. A bee pathway 4112 is in the body 4104 for providing passage for bees between the hive opening and an outside environment when the body 4104 is mounted to the hive. An inoculum dispenser 4130 is mounted in the body 4104, and is operable to controllably dispense inoculum into the bee pathway 4112 to dust bees passing through the bee pathway 4112 with the inoculum.

In the example illustrated, the system 1100 includes a controller 4230 for controlling operation of the dispenser 4130 according to one or more operating parameters. The operating parameters can include, for example, a state of the dispenser 4130 (e.g. an on/off state), a rate at which to operate the dispenser 4130, a time interval for operating the dispenser 4130, and/or an amount of inoculum for the dispenser 4130 to dispense. The operating parameters can be stored on, for example, computer-readable memory 4232 in communication with the controller 4230.

In the example illustrated, the controller 4230 is operable to detect a modification event and to modify the one or more operating parameters in response to detecting the modification event.

In some examples, the system 4100 can include a communication unit 4280 operable to communicate with the controller 4230. The communication unit 4280 can include a wireless communication unit. In some examples, the modification event can include receipt by the controller 4230 of a modification command from the communication unit 4280. The modification command can comprise a modification to one or more operating parameters. This can help allow for a user to, for example, control operation of the dispenser 4130 by sending modification commands from a local or remote computer in communication with the communication unit 4280.

In some examples, the controller 4230 can be operable to detect the modification event by: receiving at least one environment signal representative of one or more environmental states, and determining that a modification condition is satisfied based on the one or more environmental states. The environmental states can include at least one of, for example, an intensity of daylight; a temperature of at least one of the outside environment, the bee pathway 4112, and an interior of the bee hive; a time of day; a humidity of the outside environment; a precipitation characteristic of the outside environment; an amount of inoculum remaining in the bee pathway 4112; motion of bees in the bee pathway 4112; a rate of bees passing through the bee pathway 4112; installation of an inoculum cartridge in the body 4104; a cartridge characteristic of the inoculum cartridge, etc.

In such examples, the controller 4230 can be operable to, in response to determining that the modification condition is satisfied, modify the one or more operating parameters to correspond to target parameters associated with the environmental states. This can facilitate automatic modification and optimization of the operating parameters based on, for example, changes in environmental states in and around the system 4100. For example, the modification condition can specify one or more environmental requirements for the controller to modify the operating parameters. The modification condition can, for example, require that an outside temperature reach a temperature threshold, a daylight intensity reach a daylight intensity threshold, and an inoculum cartridge is installed. The target parameters can specify, for example, how the controller is to modify the operating parameters once these environmental requirements are satisfied. The target parameters can be stored on, for example, the computer-readable memory 4232. Once the controller determines that this modification condition is satisfied, the controller can, for example, modify the state of the dispenser 4130 from an off state to an on state to initiate operation of the dispenser 4130, and to modify the time intervals for operating the dispenser 4130 to dispense inoculum more frequently.

In some examples, the operating parameters can include one of an on state of the dispenser 4130 and an off state of the dispenser 4130, and the target parameters can include the other one of the on state and the off state. In some examples, the operating parameters can include a first rate at which to operate the dispenser 4130, and the target parameters can include a second rate at which to operate the dispenser 4130, with the second rate being different from the first rate. In some examples, the operating parameters can include a first time interval for operating the dispenser 4130 to periodically dispense the inoculum into the bee pathway, and the target parameters can include a second time interval for operating the dispenser 4130, with the second time interval being different from the first time interval. In some examples, the operating parameters can include a first amount of inoculum for the dispenser to dispense 4130, and the target parameters can include a second amount of inoculum for the dispenser 4130 to dispense, with the second amount being different from the first amount.

In some examples, the system 4100 includes at least one environment sensor 4282 for sensing one or more of the environmental states and generating the at least one environment signal. The at least one environment sensor 4282 can include, for example, a daylight sensor, a temperature sensor, a humidity sensor, a precipitation sensor, a pressure sensor, a proximity sensor, an actuator, a switch, a motion sensor, a weight sensor, a sound sensor, an optical sensor, an infrared sensor, a camera, an RFID reader, and/or any other sensors suitable for sensing the environmental states.

In some examples, the at least one environment signal can include a time-of-day signal representative of a time of day, and the controller 4230 can be operable to determine whether the modification condition is satisfied based on the time of day. In some examples, the system 4100 includes a clock for monitoring the time of day and generating the time-of-day signal.

In some examples, the at least one environment signal can include at least one daylight intensity signal representative of an intensity of daylight of the outside environment, and the controller 4230 can be operable to determine whether the modification condition is satisfied based on the intensity of daylight. In some examples, the system 4100 includes at least one daylight sensor for measuring the intensity of daylight and generating the daylight intensity signal.

In some examples, the at least one environment signal can include at least one temperature signal representative of a temperature of at least one of the outside environment, the bee pathway 4112, and an interior of the bee hive, and the controller 4230 can be operable to determine whether the modification condition is satisfied based on the temperature. In some examples, the system 4100 can include at least one temperature sensor for measuring the temperature and generating the temperature signal.

In some examples, the at least one environment signal can include at least one humidity signal representative of a humidity of the outside environment, and the controller 4230 can be operable to determine whether the modification condition is satisfied based on the humidity. In some examples, the system 4100 can include at least one humidity sensor for measuring the humidity and generating the humidity signal.

In some examples, the at least one environment signal can include at least one precipitation signal representative of a precipitation characteristic in the outside environment, and the controller 4230 can be operable to determine whether the modification condition is satisfied based on the precipitation characteristic. In some examples, the system 4100 can include a precipitation sensor for measuring the precipitation characteristic and generating the precipitation signal.

In some examples, the at least one environment signal can include at least one remaining inoculum signal representative of a remaining amount of inoculum in the bee pathway 4112, and the controller 4230 can be operable to determine whether the modification condition is satisfied based on the remaining amount of inoculum. In some examples, the system 4100 can include a remaining inoculum sensor for measuring the remaining inoculum in the bee pathway 4112 and generating the remaining inoculum signal.

In some examples, the at least one environment signal can include at least one motion signal representative of a motion of bees in the bee pathway, and the controller can be operable to determine whether the modification condition is satisfied based on the motion of bees. In some examples, the system includes a motion sensor for sensing the motion of bees in the bee pathway and generating the motion signal.

In some examples, the at least one environment signal can include at least one bee rate signal representative of a rate of bees passing through the bee pathway 4112, and the controller 4230 can be operable to determine whether the modification condition is satisfied based on the rate of bees. In some examples, the system 4100 can include a bee rate sensor for measuring the rate of bees passing through the bee pathway 4112 and generating the rate signal.

In some examples, the at least one environment signal can include at least one cartridge installation signal representative of installation of an inoculum cartridge in the body 4104 for providing the inoculum to the dispenser 4130, and the controller 4230 can be operable to determine whether the modification condition is satisfied based on whether the cartridge is installed. In some examples, the system 4100 can include a cartridge installation sensor for detecting installation of the cartridge and generating the cartridge installation signal.

In some examples, the at least one environment signal can include at least one cartridge characteristic signal representative of a cartridge characteristic of a cartridge installed in the body 4104 for providing the inoculum to the dispenser 4130, and the controller 4230 can be operable to determine whether the modification condition is satisfied based on the cartridge characteristic. In some examples, the system 4100 can include a cartridge characteristic sensor for sensing the cartridge characteristic and generating the cartridge characteristic signal.

In some examples, the at least one environment signal can include a hive size signal representative of a size of the bee hive, and the controller 4230 can be operable to determine whether the modification condition is satisfied based on the hive size. In some examples, the at least one environment signal can include a bee quantity signal representative of a quantity of bees expected to inhabit the hive, and the controller 4230 can be operable to determine whether the modification condition is satisfied based on the quantity of bees. In some examples, the at least one environment signal can include a bee type signal representative of a type of bee expected to inhabit the bee hive, and the controller 4230 can be operable to determine whether the modification condition is satisfied based on the bee type. Such examples may facilitate modification of operating parameters (e.g. frequency of dispensing or amount dispensed) when the body 4104 is moved from a first hive to a second hive having different characteristics from the first hive. The hive characteristics may be indicated using, for example, RFID tags.

In some examples, the system can include a positioning unit operable to determine a location of the bee hive.

In some examples, the system can include a power supply unit 4284 for supplying power to the system. The power supply unit 4284 can include a power storage unit and a solar power generator for charging the power storage unit.

Referring to FIG. 21, a method 4500 for controlling operation of the inoculation system 4100 is shown. At step 4510, inoculum is provided to the dispenser 4130. At step 4520, operation of the dispenser 4130 is controlled according to one or more operating parameters to dispense the inoculum into the bee pathway 4112. At step 4530, the one or more operating parameters are modified in response to detecting a modification event. At step 4540, operation of the dispenser 4130 is controlled according to one or more modified operating parameters.

In some examples, detecting the modification event includes: receiving at least one environment signal representative of one or more environmental states, and determining that a modification condition is satisfied based on the one or more environmental states. In such examples, at step 4530, the operating parameters can be modified to correspond to target parameters associated with the environmental states.

In some examples, the modification event can include receiving a modification command from a communication unit, and the modification command can include a modification to the operating parameters.

Referring to FIG. 22, another example inoculation system 5100 for a bee yard is illustrated. The system 5100 has similarities to the system 4100, and like features are identified with like reference characters, incremented by 1000.

In the example illustrated, the bee yard includes a first hive 5102 having a first hive opening, and a second hive 5103 having a second hive opening. In the example illustrated, the system 5100 includes a first body 5104 mounted to the first hive 5102 intermediate the first hive opening and an outside environment 5114 external the first and second hives 5102, 5103. A first hive bee pathway 5112 is in the first body 5104 for providing passage for bees between the first hive opening of the first hive and the outside environment 5114 when the first body 5104 is mounted to the first hive 5102. A first inoculum dispenser 5130 is mounted in the first body 5104. The first inoculum dispenser 5130 is operable to controllably dispense a first inoculum into the first hive bee pathway 5112 to dust bees passing through the first hive bee pathway 5112 with the first inoculum.

In the example illustrated, the system 5100 further includes a second body 5604 mounted to the second hive 5103 intermediate the second hive opening and the outside environment 5114. The second body 5604 is similar to the first body 5104. A second hive bee pathway 5612 is in the second body 5604 for providing passage for bees between the second hive opening and the outside environment 5114 when the second body 5604 is mounted to the second hive 5103. A second inoculum dispenser 5630 is mounted in the second body 5604. The second inoculum dispenser 5630 is similar to the first inoculum dispenser 5130. The second inoculum dispenser 5630 is operable to controllably dispense a second inoculum into the second hive bee pathway 5612 to dust bees passing through the second hive bee pathway 5612 with the second inoculum.

In the example illustrated, the system 5100 further includes a central controller 5230 for controlling operation of the first inoculum dispenser 5130 according to a first set of operating parameters, and for controlling the second inoculum dispenser 5630 according to a second set of operating parameters.

In some examples, the controller 5230 is operable to detect a first modification event and to modify the first set of operating parameters in response to detecting the first modification event. In some examples, the controller is operable to detect a second modification event and to modify the second set of operating parameters in response to detecting the second modification event.

The examples of the systems and methods described herein may be implemented in hardware or software, or a combination of both. These examples may be implemented in, for example, computer programs executing on programmable computers, and each computer may include at least one processor, a data storage system (including volatile memory, non-volatile memory, other data storage elements, and/or a combination thereof), and one or more communication interfaces.

The invention claimed is:

1. An inoculation system for a bee hive having a hive opening, comprising:
    (a) a body mountable to the bee hive intermediate the hive opening and an outside environment external the hive;
    (b) a bee exit pathway in the body for providing passage for bees between the hive opening and the outside environment when the body is mounted to the hive, the bee exit pathway serving as a hive exit and defined by a pathway floor;
    (c) an inoculum reservoir in the body for storing powdered inoculum, the reservoir having a reservoir outlet above the bee exit pathway;
    (d) an inoculum dispenser mounted in the body, the dispenser operable to controllably drop the inoculum into the bee exit pathway to dust bees passing through the bee exit pathway with the inoculum, the dispenser including a dispensing element adjacent the reservoir outlet and an electric motor coupled to the dispensing element for driving movement of the dispensing element when energized, the dispensing element blocking dropping of the inoculum from the reservoir outlet when at rest, and the dispensing element conveying the inoculum away from the reservoir outlet and dropping the inoculum across the pathway floor when being driven by the motor; and
    (e) a controller for controlling operation of the motor according to one or more operating parameters, the controller operable to:
        (i) receive sensor data representative of at least a plurality of environmental states external the hive;
        (ii) determine whether the sensor data satisfies a modification condition corresponding to a change in the environmental states;
        (iii) in response to determining that the sensor data does not satisfy the modification condition, continue controlling operation of the motor according to the one or more operating parameters, the one or more operating parameters defining an initial rate at which to drop the inoculum into the bee exit pathway; and
        (iv) in response to determining that the sensor data satisfies the modification condition, determine an adjusted rate at which to drop the inoculum into the bee exit pathway based on the sensor data, and control operation of the motor according to one or more adjusted operating parameters defining the adjusted rate, the adjusted rate different from the initial rate,
    wherein the system further comprises a bee entrance pathway in the body for providing passage for bees between the outside environment and the hive opening, the bee entrance pathway above and separate from the bee exit pathway, wherein the bee entrance pathway serves as a hive entrance and the bee exit pathway serves as a hive exit, and
    wherein the reservoir is vertically intermediate the bee exit pathway and the bee entrance pathway.

2. The system of claim 1, wherein the initial rate is defined by a first time interval for operating the dispenser to periodically dispense the inoculum into the bee exit pathway, and the adjusted rate is defined by a second time interval for operating the dispenser, the second time interval different from the first time interval.

3. The system of claim 1, wherein the initial rate is defined by a first amount of the inoculum for the dispenser to dispense, and the adjusted rate is defined by a second amount of the inoculum for the dispenser to dispense, the second amount different from the first amount.

4. The system of claim 1, further comprising a plurality of environment sensors for sensing the plurality of environmental states external the hive and generating the sensor data.

5. The system of claim 1, further comprising a power supply unit for supplying power to the system, the power supply unit including a power storage unit and a solar power generator for charging the power storage unit.

6. The system of claim 1, wherein the plurality of environmental states comprises at least one of: (i) temperature; and (ii) daylight.

7. The system of claim 1, wherein the plurality of environmental states comprises at least temperature and daylight.

8. The system of claim 1, wherein each of the reservoir outlet and the dispensing element extends across at least 75% of a width of the bee exit pathway.

9. An inoculation system for a bee hive having a hive opening, comprising:
    (a) a body mountable to the bee hive intermediate the hive opening and an outside environment external the hive;
    (b) a first bee pathway in the body for providing passage for bees between the hive opening and the outside environment when the body is mounted to the hive, the first bee pathway serving as a hive exit and defined by a pathway floor and a pathway ceiling above the pathway floor;
    (c) a second bee pathway in the body for providing passage for bees between the outside environment and the hive opening, the second bee pathway above and separate from the first bee pathway, and the second bee pathway serving as a hive entrance;
    (d) an inoculum reservoir in the body vertically intermediate the first bee pathway and the second bee pathway for storing powdered inoculum, the reservoir having a reservoir outlet in the pathway ceiling, the reservoir outlet extending across at least 75% of a width of the first bee pathway;

(e) an inoculum dispenser mounted in the body, the dispenser operable to controllably drop the inoculum into the first bee pathway to dust bees passing through the first bee pathway with the inoculum, the dispenser including a dispensing element adjacent the reservoir outlet and an electric motor coupled to the dispensing element for driving movement of the dispensing element when energized, the dispensing element blocking dropping of the inoculum from the reservoir outlet when at rest, and the dispensing element conveying the inoculum away from the reservoir outlet and dropping the inoculum across the pathway floor when being driven by the motor; and (f) a controller for controlling operation of the motor to periodically drive movement of the dispensing element to drop the inoculum into the first bee pathway, the controller operable to:

(i) receive sensor data representative of a plurality of environmental states external the hive;

(ii) determine, based on the sensor data, whether the plurality of environmental states satisfy corresponding environmental requirements for dropping the inoculum into the first bee pathway;

(iii) in response to determining that the environmental requirements are satisfied, enable periodic energization of the motor for driving movement of the dispensing element to periodically drop the inoculum into the first bee pathway; and (iv) in response to determining that the environmental requirements are not satisfied, disable periodic energization of the motor to leave the dispensing element at rest for blocking dropping of the inoculum into the first bee pathway until the environmental requirements are satisfied.

10. An inoculation system for a bee hive having a hive opening, comprising:

(a) a body mountable to the bee hive intermediate the hive opening and an outside environment external the hive;

(b) a bee exit pathway in the body for providing passage for bees between the hive opening and the outside environment when the body is mounted to the hive, the bee exit pathway serving as a hive exit and defined by a floor and a ceiling above the floor, and the bee exit pathway having an exit pathway width extending between opposed sidewalls;

(c) a bee entrance pathway in the body for providing passage for bees between the outside environment and the hive opening, the bee entrance pathway above and separate from the bee exit pathway, and the bee entrance pathway serving as a hive entrance;

(d) an inoculum reservoir in the body vertically intermediate the bee exit pathway and the bee entrance pathway for storing powdered inoculum, the reservoir having a reservoir outlet in the ceiling of the bee exit pathway;

(e) an inoculum dispenser mounted in the body, the dispenser operable to controllably drop the inoculum into the bee exit pathway to dust bees passing through the bee exit pathway with the inoculum, the dispenser including a dispensing element adjacent the reservoir outlet and an electric motor coupled to the dispensing element for driving movement of the dispensing element when the electric motor is energized, the dispensing element blocking dropping of the inoculum from the reservoir outlet when at rest, and the dispensing element conveying the inoculum from the reservoir outlet and dropping the inoculum on the floor in a generally uniform distribution across the exit pathway width when being driving by the motor; and (f) a controller for controlling operation of the dispenser, the controller configured to:

(i) monitor a plurality of environmental states based on sensor data from a plurality of sensors;

(ii) in response to the environmental states satisfying predefined dispensing requirements for periodically dispensing inoculum:

energize the motor at predefined time intervals to periodically drop an amount of inoculum into the bee exit pathway, the amount of inoculum and the time intervals defined by operating parameters for the dispenser, evaluate whether the environmental states satisfy an adjustment threshold, and in response to the environmental states satisfying the adjustment threshold: adjust at least one of (A) the time intervals and (B) the amount of inoculum, by modifying the operating parameters to correspond to target parameters associated with the environmental states; and (iii) in response to the environmental states not satisfying the predefined dispensing requirements, stop dispensing of the inoculum at least until the dispensing requirements are satisfied.

11. The inoculation system of claim 10, wherein the time intervals are between 30 seconds and 5 minutes.

12. The inoculation system of claim 10, wherein the time intervals are adjustable by the controller to dispense inoculum more frequently.

13. The inoculation system of claim 10, wherein the plurality of environmental states comprises weather conditions around the hive, and at least one of: (1) the dispensing requirements and (2) the adjustment threshold, is based on the weather conditions.

14. The inoculation system of claim 10, wherein the plurality of environmental states comprises time of day, and at least one of: (1) the dispensing requirements and (2) the adjustment threshold, is based on the time of day.

* * * * *